(12) United States Patent
Ramasamy et al.

(10) Patent No.: US 11,741,704 B2
(45) Date of Patent: Aug. 29, 2023

(54) TECHNIQUES FOR AUGMENTED REALITY ASSISTANCE

(71) Applicant: QUALCOMM Incorporated, San Diego, CA (US)

(72) Inventors: Bala Ramasamy, San Diego, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 17/001,046

(22) Filed: Aug. 24, 2020

(65) Prior Publication Data

US 2021/0064877 A1 Mar. 4, 2021

Related U.S. Application Data

(60) Provisional application No. 62/894,580, filed on Aug. 30, 2019.

(51) Int. Cl.

| | |
|---|---|
| *G08G 1/14* | (2006.01) |
| *G06V 20/20* | (2022.01) |
| *H04W 4/021* | (2018.01) |
| *H04W 4/44* | (2018.01) |
| *G06Q 30/0207* | (2023.01) |

(Continued)

(52) U.S. Cl.
CPC ............ *G06V 20/20* (2022.01); *B60W 30/06* (2013.01); *G06Q 30/0215* (2013.01); *G06Q 30/0645* (2013.01); *G06V 20/56* (2022.01); *G08G 1/144* (2013.01); *G08G 1/149* (2013.01); *H04W 4/021* (2013.01); *H04W 4/44* (2018.02);

(Continued)

(58) Field of Classification Search
CPC ......... G06V 20/20; G06V 20/56; H04W 4/44; H04W 4/021; B60W 30/06; G06Q 30/0215; G06Q 30/0645; G06Q 50/26; G06Q 2240/00; G08G 1/144; G08G 1/149; G01S 5/02585; G01S 19/45
USPC .......................................................... 345/633
See application file for complete search history.

(56) References Cited

U.S. PATENT DOCUMENTS 9,965,768 B1 * 5/2018 Doane ................. G06Q 30/0251
10,136,295 B1 * 11/2018 Chee ..................... H04L 67/125
(Continued)

FOREIGN PATENT DOCUMENTS

| CN | 108417013 A | 8/2018 |
|---|---|---|
| EP | 3462429 A1 | 4/2019 |

OTHER PUBLICATIONS

International Search Report and Written Opinion—PCT/US2020/048030—ISA/EPO—dated Nov. 10, 2020.

*Primary Examiner* — Kerri L McNally
*Assistant Examiner* — Thang D Tran
(74) *Attorney, Agent, or Firm* — Thien T. Nguyen

(57) ABSTRACT

Techniques are provided which may be implemented using various methods and/or apparatuses to provide augmented reality assistance. An example method includes obtaining a location of the mobile device, and obtaining local rules based on the location of the mobile device. The method also includes obtaining one or more images of an environment in proximity to the mobile device, identifying one or more areas of the environment in the one or more images based on the local rules, and displaying augmented reality (AR) assistance at the mobile device, wherein the AR assistance is based on the identified one or more areas of the environment.

42 Claims, 10 Drawing Sheets

(51) Int. Cl.
  *B60W 30/06* (2006.01)
  *G06Q 30/0645* (2023.01)
  *G06V 20/56* (2022.01)
  *G01S 5/02* (2010.01)
  *G06Q 50/26* (2012.01)
  *G01S 19/45* (2010.01)

(52) U.S. Cl.
  CPC ........... *G01S 5/02585* (2020.05); *G01S 19/45* (2013.01); *G06Q 50/26* (2013.01); *G06Q 2240/00* (2013.01)

(56) References Cited

U.S. PATENT DOCUMENTS

| | | | | |
|---|---|---|---|---|
| 10,189,479 | B2* | 1/2019 | Innes | H04W 4/027 |
| 10,218,941 | B1* | 2/2019 | Park | G06F 16/5866 |
| 10,834,523 | B1* | 11/2020 | Rao | B64C 39/024 |
| 11,378,413 | B1* | 7/2022 | Rao | G06V 20/20 |
| 2011/0034183 | A1* | 2/2011 | Haag | G08G 1/0967 |
| | | | | 455/456.3 |
| 2011/0140927 | A1* | 6/2011 | Lee | G08G 1/207 |
| | | | | 340/993 |
| 2011/0320256 | A1* | 12/2011 | Florucci | H04W 4/42 |
| | | | | 705/14.27 |
| 2013/0083007 | A1* | 4/2013 | Geisner | G06T 19/006 |
| | | | | 345/419 |
| 2014/0067259 | A1* | 3/2014 | Walsh | G08G 1/096716 |
| | | | | 701/437 |
| 2014/0111545 | A1* | 4/2014 | Damola | H04N 21/2223 |
| | | | | 345/633 |
| 2015/0185034 | A1* | 7/2015 | Abhyanker | G06Q 50/01 |
| | | | | 701/23 |
| 2015/0242895 | A1* | 8/2015 | Brown | G06Q 30/0267 |
| | | | | 705/14.55 |
| 2015/0262208 | A1* | 9/2015 | Bjontegard | G06Q 30/0205 |
| | | | | 705/7.31 |
| 2016/0042563 | A1* | 2/2016 | Ur | G06T 11/00 |
| | | | | 345/633 |
| 2016/0111003 | A1* | 4/2016 | Miura | G08G 1/146 |
| | | | | 340/932.2 |
| 2016/0150363 | A1* | 5/2016 | Hughes | H04W 4/029 |
| | | | | 455/456.1 |
| 2017/0191849 | A1* | 7/2017 | Agam | G08G 1/148 |
| 2017/0278305 | A1* | 9/2017 | Sisbot | G06F 3/167 |
| 2017/0330460 | A1* | 11/2017 | Massey | G06Q 10/10 |
| 2018/0137373 | A1* | 5/2018 | Rasmusson, Jr. | G06V 20/56 |
| 2018/0211534 | A1* | 7/2018 | de Moura | G06Q 50/30 |
| 2018/0211541 | A1* | 7/2018 | Rakah | G08G 1/148 |
| 2018/0315313 | A1* | 11/2018 | Klochikhin | H04W 4/02 |
| 2018/0357907 | A1* | 12/2018 | Reiley | H04W 4/023 |
| 2019/0050654 | A1* | 2/2019 | Payne-Short | G06V 10/44 |
| 2019/0066517 | A1* | 2/2019 | Neser | G06F 3/00 |
| 2019/0096254 | A1* | 3/2019 | Havercamp | G06V 30/1473 |
| 2019/0101922 | A1* | 4/2019 | Matsumura | G05D 1/0088 |
| 2019/0102728 | A1* | 4/2019 | Lee | G06Q 10/087 |
| 2019/0128676 | A1* | 5/2019 | Naik | G01C 21/206 |
| 2019/0147743 | A1* | 5/2019 | Kamini | G06T 7/70 |
| | | | | 348/118 |
| 2019/0199847 | A1* | 6/2019 | Nguyen | H04M 3/53308 |
| 2019/0228396 | A1* | 7/2019 | Boncimino | G06Q 20/208 |
| 2019/0244516 | A1* | 8/2019 | Matus | G08G 1/0967 |
| 2019/0259182 | A1* | 8/2019 | Sarukkai | G06V 10/454 |
| 2019/0271553 | A1* | 9/2019 | Simpson | G06Q 50/01 |
| 2019/0333181 | A1* | 10/2019 | Simpson | G06Q 30/0283 |
| 2019/0371175 | A1* | 12/2019 | Joos | G06F 16/29 |
| 2019/0383627 | A1* | 12/2019 | Nangeroni | B60W 50/0098 |
| 2020/0011671 | A1* | 1/2020 | Puri | G01C 21/3691 |
| 2020/0257909 | A1* | 8/2020 | Korman | G08G 1/0141 |
| 2020/0307554 | A1* | 10/2020 | Lai | G06V 20/582 |
| 2020/0387127 | A1* | 12/2020 | McGill | G05B 19/0423 |
| 2020/0394913 | A1* | 12/2020 | Reaser | G06Q 50/30 |
| 2020/0400441 | A1* | 12/2020 | Efland | G01C 21/3822 |
| 2021/0007459 | A1* | 1/2021 | Jeong | A45D 29/18 |
| 2021/0029075 | A1* | 1/2021 | Yu | H04L 67/1001 |
| 2021/0038975 | A1* | 2/2021 | Grillet | G06F 3/04815 |
| 2021/0155269 | A1* | 5/2021 | Oba | H04W 4/44 |
| 2021/0243418 | A1* | 8/2021 | Ojala | H04N 13/366 |
| 2021/0269045 | A1* | 9/2021 | Katz | G06V 20/56 |

* cited by examiner

TECHNIQUES FOR AUGMENTED REALITY ASSISTANCE

CROSS-REFERENCE TO RELATED APPLICATIONS

This application claims the benefit of U.S. Provisional Application No. 62/894,580, entitled "TECHNIQUES FOR AUGMENTED REALITY ASSISTANCE," filed Aug. 30, 2019, which is assigned to the assignee hereof and which is expressly incorporated herein by reference in its entirety.

BACKGROUND

1. Field

The subject matter disclosed herein relates to mobile devices, and more particularly to methods, messaging and apparatuses for use in or with transportation device rental management.

2. Information

Traditionally, people have used cars, public transportation, and bicycles to travel to desired destination within a city, or have traveled by foot. However, different modes of transportation are becoming more common as technology develops. One such mode of transportation that is becoming more popular is the use of electric scooters and bicycles that can be rented by users. To enhance the convenience of the usage of such transportation devices, the rental companies that provide the devices allow the user to leave the devices at whatever location the user wants to stop using the device. While being convenient for the users, certain problems may arise as a result of this practice. For example, users may leave the devices in the middle of sidewalks or other public places which clutters the area. In addition, the devices may be vandalized or stolen if left in certain areas.

Another mode of transportation that has become common is the use of ride-sharing services and ride-hailing services that provide alternatives to traditional taxi services. The ride-sharing and ride-hailing services may present similar problems where passengers may be picked up in non-traditional locations. In addition, when large numbers of passengers want to be picked up, sidewalks and other public places near pickup locations may become crowded or dangerous.

SUMMARY

Some example techniques are presented herein which may be implemented in various methods and apparatuses provide augmented reality assistance related to use of vehicle rental or passenger services.

In one aspect, a method of providing augmented reality (AR) assistance includes obtaining a location of the mobile device, and obtaining local rules based on the location of the mobile device. The method also includes obtaining one or more images of an environment in proximity to the mobile device, identifying one or more areas of the environment in the one or more images based on the local rules, and displaying AR assistance at the mobile device, wherein the AR assistance is based on the identified one or more areas of the environment.

In another aspect, a mobile device includes a wireless transceiver, a memory, and a processor communicatively coupled to the wireless transceiver and the memory. The processor is configured to obtain a location of the mobile device, and obtain local rules based on the location of the mobile device. The processor is also configured to obtain one or more images of an environment in proximity to the mobile device, identify one or more areas of the environment in the one or more images based on the local rules, and display augmented reality (AR) assistance at the mobile device, wherein the AR assistance is based on the identified one or more areas of the environment.

In another aspect, an apparatus includes means for obtaining a location of the apparatus, and means for obtaining local rules based on the location of the apparatus. The apparatus also includes means for obtaining one or more images of an environment in proximity to the apparatus, means for identifying one or more areas of the environment in the one or more images based on the local rules, and means for displaying augmented reality (AR) assistance at the apparatus, wherein the AR assistance is based on the identified one or more areas of the environment.

In yet another aspect, a non-transitory storage medium includes processor-executable instructions. When a processor executes the instructions, the processor is programmed to obtain a location of the mobile device, and obtain local rules based on the location of the mobile device. The processor is also programmed to obtain one or more images of an environment in proximity to the mobile device, identify one or more areas of the environment in the one or more images based on the local rules, and display augmented reality (AR) assistance at the mobile device, wherein the AR assistance is based on the identified one or more areas of the environment.

In another aspect, a method of supporting vehicle parking management using a mobile device, includes transmitting a request to rent a vehicle using the mobile device, wherein the vehicle is activated in response to the request; obtaining a location of the mobile device; sending a first notification of parking the vehicle including an indication of the location; receiving a request to move the vehicle to a new parking area; obtaining a new location of the mobile device after the vehicle is moved; sending a second notification of parking the vehicle including an indication of the new location; and receiving an acknowledgement of parking the vehicle in an acceptable parking area.

In another aspect, a mobile device, includes a wireless transceiver; a memory; and at least one processor, communicatively coupled to the wireless transceiver and the memory, wherein the at least one processor is configured to: transmit a request to rent a vehicle using the mobile device, wherein the vehicle is activated in response to the request; obtain a location of the mobile device; send a first notification of parking the vehicle including an indication of the location; receive a request to move the vehicle to a new parking area; obtain a new location of the mobile device after the vehicle is moved; send a second notification of parking the vehicle including an indication of the new location; and receive an acknowledgement of parking the vehicle in an acceptable parking area.

In another aspect, a mobile device includes means for transmitting a request to rent a vehicle using the mobile device, wherein the vehicle is activated in response to the request; means for obtaining a location of the mobile device; means for sending a first notification of parking the vehicle including an indication of the location; means for receiving a request to move the vehicle to a new parking area; means for obtaining a new location of the mobile device after the vehicle is moved; means for sending a second notification of parking the vehicle including an indication of the new location; and means for receiving an acknowledgement of parking the vehicle in an acceptable parking area.

In yet another aspect, a non-transitory storage medium includes processor-executable instructions. When a processor executes the instructions, the processor is programmed to transmit a request to rent a vehicle using the mobile device, wherein the vehicle is activated in response to the request; obtain a location of the mobile device; send a first notification of parking the vehicle including an indication of the location; receive a request to move the vehicle to a new parking area; obtain a new location of the mobile device after the vehicle is moved; send a second notification of parking the vehicle including an indication of the new location; and receive an acknowledgement of parking the vehicle in an acceptable parking area.

In another aspect, a method of supporting vehicle parking management using a mobile device, the method performed by a server, includes receiving a request to rent a vehicle from the mobile device, wherein the vehicle is activated in response to the request; receiving a first notification of parking the vehicle from the mobile device, the first notification including an indication of a location of the mobile device; sending a request to move the vehicle to a new parking area based on the indication of the location of the mobile device; receiving a second notification of parking the vehicle from the mobile device, the second notification including an indication of a new location of the mobile device; and sending an acknowledgement of parking the vehicle in an acceptable parking area based on the indication of the new location of the mobile device.

In another aspect, a server, includes a network interface; a memory; and at least one processor communicatively coupled to the network interface and the memory, wherein the at least one processor is configured to: receive a request to rent a vehicle from a mobile device, wherein the vehicle is activated in response to the request; receive a first notification of parking the vehicle from the mobile device, the first notification including an indication of a location of the mobile device; send a request to move the vehicle to a new parking area based on the indication of the location of the mobile device; receive a second notification of parking the vehicle from the mobile device, the second notification including an indication of a new location of the mobile device; and send an acknowledgement of parking the vehicle in an acceptable parking area based on the indication of the new location of the mobile device.

In another aspect, a server includes means for receiving a request to rent a vehicle from the mobile device, wherein the vehicle is activated in response to the request; means for receiving a first notification of parking the vehicle from the mobile device, the first notification including an indication of a location of the mobile device; means for sending a request to move the vehicle to a new parking area based on the indication of the location of the mobile device; means for receiving a second notification of parking the vehicle from the mobile device, the second notification including an indication of a new location of the mobile device; and means for sending an acknowledgement of parking the vehicle in an acceptable parking area based on the indication of the new location of the mobile device.

In yet another aspect, a non-transitory storage medium includes processor-executable instructions. When a processor executes the instructions, the processor is programmed to receive a request to rent a vehicle from a mobile device, wherein the vehicle is activated in response to the request; receive a first notification of parking the vehicle from the mobile device, the first notification including an indication of a location of the mobile device; send a request to move the vehicle to a new parking area based on the indication of the location of the mobile device; receive a second notification of parking the vehicle from the mobile device, the second notification including an indication of a new location of the mobile device; and send an acknowledgement of parking the vehicle in an acceptable parking area based on the indication of the new location of the mobile device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some example techniques are presented herein which may be implemented in various methods, means and apparatuses in a vehicle or mobile device. Example techniques presented herein address various methods and apparatuses in a mobile device to provide for or otherwise support rental vehicle parking management, including the use of augmented reality (AR) assistance.

Figure 1:
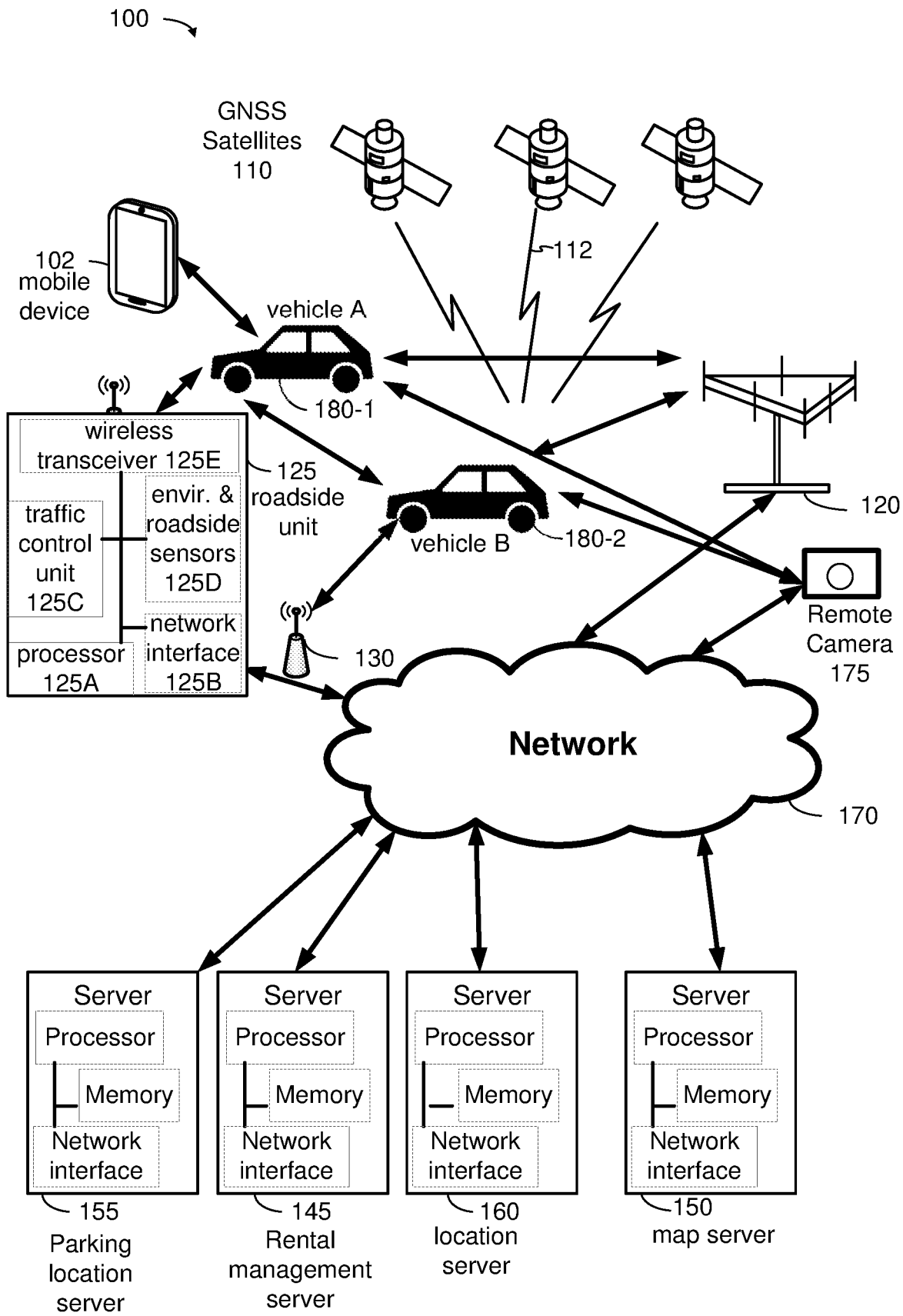
FIG. 1 illustrates an exemplary system for providing augmented reality assistance.

FIG. 1 is a block diagram illustrating an example system 100 that may be used to provide augmented reality (AR) assistance in relation to rental vehicle parking management or other suitable uses. In the example shown in FIG. 1, system 100 includes a mobile device 102, one or more vehicles 180 (such as a first vehicle 180-1 and a second vehicle 180-2), one or more GNSS satellites 110, a base station 120, an access point 130, one or more roadside units (RSUs) 125, one or more remote cameras 175, and one or more servers, such as a parking location server 155, a rental management server 145, a location server 160, and a map server 150. It should be recognized that some devices or components may not be included in some examples of system 100 and/or that some devices or components labeled or identified in FIG. 1 may be combined together to include the functionality of both devices or components.

Vehicles 180, such as vehicle A 180-1 and vehicle B 180-2, may be any suitable vehicle that may be rented, leased, hailed, or otherwise temporarily accessed in exchange for money. While a car is illustrated in FIG. 1 as being the vehicle A 180-1 and vehicle B 180-2, it should be recognized that any suitable vehicle may be used in system 100, such as electric scooters, wheelchairs, bicycles (manual, electric, and hybrid), or any other vehicle. Vehicles described herein may also be referred to as transportation devices.

In an embodiment, roadside unit (RSU) 125 may be used to monitor, communicate with, and/or determine a location of vehicles 180 within system 100. RSU 125 may include a processor 125A configured to operate wireless transceiver 125E to send and receive wireless messages, for example, Basic Safety Messages (BSM) or Cooperative Awareness Messages (CAM) or other vehicle-to-everything (V2X) messages to/from vehicle A 180-1 and/or vehicle B 180-2, from base station 120 and/or access point 130. For example, wireless transceiver 125E may send and/or receive wireless messages in various protocols such as V2X communication with vehicles, and/or using various WAN, WLAN and/or PAN protocols to communicate over a wireless communication network. In an embodiment, wireless transceiver 125E may communicate over a wireless communication network by transmitting or receiving wireless signals from a wireless base transceiver subsystem (BTS), a Node B or an evolved NodeB (eNodeB) or a next generation NodeB (gNodeB) over wireless communication link. In an embodiment, wireless transceiver(s) 125E may comprise various combinations of WAN, WLAN and/or PAN transceivers. In an embodiment, a local transceiver may also be a Bluetooth transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). It should be understood that these are merely examples of networks that may communicate with a roadside unit (RSU) 125 over a wireless link, and claimed subject matter is not limited in this respect.

RSU 125 may receive location, status and capability information from vehicle A 180-1 and/or vehicle B 180-2 such as velocity, heading, location, stopping distance, priority or emergency status and other vehicle-related information and well as, in some embodiments, environmental information such as road surface information/status, weather status, and camera information. Alternatively or additionally, RSU 125 may determine the velocity, heading, location, stopping distance priority or emergency status, environmental information, weather stats and camera information using sensors 125D and processor 125A. RSU 125 may utilize received information, via wireless transceiver 125E, from vehicles 180 or from environmental and roadside sensors 125D to provide environmental, vehicular, safety and announcement messages to vehicles 180. In addition, RSU 125 may utilize the received information to determine a location of vehicles 180 and/or to determine areas of an environment proximate to vehicles 180 and/or RSU 125 in which vehicles 180 may be allowed to park or disallowed to park, in some examples.

Processor 125A may be configured to operate a network interface 125B, in an embodiment, which may be connected via a backhaul to network 170, and which may be used, in an embodiment, to communicate and coordinate with various centralized servers. Network interface 125B may also be utilized for remote access to roadside unit (RSU) 125 for crowd sourcing of vehicle data, camera data, maintenance of the roadside unit (RSU) 125, and/or coordination with other roadside units 125 or other uses. Roadside unit (RSU) 125 may have a processor 125A configured to operate traffic control unit 125C which may be configured to process data received from vehicles such as vehicle A 180-1 and vehicle B 180-2 such as location data, stopping distance data, road condition data, identification data and other information related to the status and location of nearby vehicles and environment. Roadside unit (RSU) 125 may have a processor 125A configured to obtain data from environmental and roadside sensors 125D, which may include temperature, weather, camera, pressure sensors, road sensors (for car detection, for example), accident detection, movement detection, speed detection and other vehicle and environmental monitoring sensors.

In an embodiment, vehicle A 180-1 may also communicate with mobile device 102 using short range communication and personal networks such as Bluetooth, WiFi or Zigbee or via V2X or other vehicle-related communication protocols, for example, in an embodiment to access WAN and/or WiFi networks and/or, in an embodiment, to obtain sensor and/or location measurements from mobile device 102. In an embodiment, vehicle A 180-1 may communicate with mobile device 102 using WAN related protocols through a WAN network, such as via WAN base station 120 or using WiFi either directly peer to peer or via a WiFi access point. Vehicle A 180-1 and/or vehicle B 180-2 may communicate using various communication protocols. In an embodiment, vehicle A 180-1 and/or vehicle B 180-2 may support various and multiple modes of wireless communication such as, for example, using V2X, GSM, WCDMA, LTE, CDMA, HRPD, Wi-Fi, BT, WiMAX, Long Term Evolution (LTE), 5th Generation Wireless (5G) new radio access technology (NR) communication protocols, etc.

In an embodiment, vehicle A may communicate over WAN networks using WAN protocols via base station 120 or with wireless LAN access point 130 using wireless LAN protocols such as WiFi. A vehicle may also support wireless communication using a wireless LAN (WLAN), personal area network (PAN) such as Bluetooth™ or ZigBee, DSL or packet cable for example.

Vehicle A 180-1 and/or vehicle B 180-2, in an embodiment, may contain one or more GNSS receivers such as GNSS receiver 270 (shown in FIG. 2) for reception of GNSS signals 112, from GNSS satellites 110, for location determination, time acquisition and time maintenance. Various GNSS systems may be supported alone or in combination, using GNSS receiver 270 or other receiver, to receive signals from Beidou, Galileo, Glonass, and/or GPS, and various regional navigational systems such as QZSS and NavIC or IRNSS. Other wireless systems may be utilized such as those depending on beacons such as, in an example, one or more roadside units (RSU) 125, one or more wireless LAN access point 130 or one or more base stations 120. Various GNSS signals 112 may be utilized in conjunction with car sensors 240 and/or 245 (shown in FIG. 2) to determine location, velocity, proximity to other vehicles such as between vehicle A 180-1 and vehicle B 180-2.

In an embodiment, vehicle A and/or vehicle B may access GNSS measurements and/or locations determined at least in part using GNSS as provided by mobile device 102, which, in an embodiment would also have GNSS, WAN, WiFi and other communications receivers and/or transceivers. In an embodiment, vehicle A 180-1 and/or vehicle B 180-2 may access GNSS measurements and/or locations determined at least in part using GNSS as provided by mobile device 102 as a fallback in case GNSS receiver 270 fails or provides less than a threshold level of location accuracy.

In an embodiment, Vehicle A 180-1 and/or Vehicle B 180-2 may access, either directly or indirectly (such as through a roadside unit), various servers on the network such as parking location server 155, rental management server 145, location server 160, and map server 150. The various servers including parking location server 155, rental management server 145, location server 160, and map server 150 comprise at least one processor, which may include general processors, DSPs, dedicated processors and various combinations thereof, memory including RAM, ROM, FLASH, hard drive and virtual memory or various combinations thereof, and an at least one network interface which may comprise a physical link such as a LAN cable, fiber or other physical connection, wireless links such as wide area network (WAN), wireless LAN (WLAN), personal area and short range network connections (PAN) such as Bluetooth, Zigbee, and some 5G device to device communications and/or any combination thereof.

Parking location server 155, may provide information relating to areas within an environment in which vehicles may be parked (referred to herein as "allowed parking areas"), may not be parked (referred to herein as "prohibited parking areas"), and/or that may provide an incentive for parking a vehicle (referred to herein as "incentivized parking areas"). In an embodiment, parking location server 155 may store and/or receive local rules that may be used to determine the allowed parking areas, the prohibited parking areas, and/or the incentivized parking areas. The local rules may include data representative of setbacks, easements, buffer zones, laws, regulations, ordinances, and/or other data that is indicative of restrictions or permissions on where and when vehicles may be parked in different areas of a city or other jurisdiction, and may sometimes be referred to as jurisdiction rules. The local rules, however, may include rules from multiple overlapping jurisdictions, such as federal rules, state rules, city rules, venue rules, etc.

Rental management server 145 may interface with mobile devices 102 and vehicles 180 to manage aspects of vehicle rentals. For example, rental management server 145 may receive rental requests from mobile devices 102 for the rental of a vehicle 180. The request may include a user ID of the user renting the vehicle, a desired rental time and duration, a desired rental return time, a desired location to pick up the rental vehicle, a desired location to return the rental vehicle, an authorization to deduct a rental deposit from an account of a user who will be renting the vehicle or paying for the rental, and/or any other suitable information for requesting a rental vehicle. The rental requests may also be referred to as registration requests in that the requests may result in the registration of a user with the rental vehicle by rental management server 145. Rental management server 145 may also receive return requests from mobile devices 102 to return the rental vehicle (i.e., for the user to stop use of the rental vehicle at the end of the rental). The return request may include a vehicle ID of the rental vehicle, the user ID, a request for refund of the deposit, and/or a confirmation that the vehicle was parked in an allowed or incentivized parking area. The confirmation that the vehicle was parked in an allowed or incentivized parking area may include a picture taken of the vehicle in the area, location data from mobile device 102 when the return request was sent, location data from the rental vehicle when the return request was sent, and/or any other suitable information. The return requests may also be referred to as deregistration requests in that the requests may result in the deregistration of the user with the rental vehicle by rental management server 145.

Location server 160, in an embodiment, may provide location determination capabilities, transmitter signal acquisition assistance (such as GNSS satellite orbital predictions information, time information approximate location information and/or approximate time information), transceiver almanacs such as those containing identification of and location for WiFi access points and base stations, and, in some embodiments, additional information relative to the route such as speed limits, traffic, and road status/construction status. Map server 150 which may provide map data, such as road locations, points of interest along the road, address locations along the roads, road size, road speed limits, traffic conditions, and/or road conditions (wet, slippery, snowy/icy, etc.), road status (open, under construction, accidents, etc.).

In an embodiment, vehicles 180-1 and 180-2 and mobile devices 102, in FIG. 1, may communicate over network 170 via various network access points such as wireless LAN access point 130 or wireless WAN base station 120 over network 170. Vehicles 180-1 and 180-2 and mobile devices 102, in FIG. 1, may also, in some embodiments, communicate directly between devices, between vehicles and device to vehicle and vehicle to device using various shorter-range communications mechanisms to communicate directly without going over network 170, such as via Bluetooth, Zigbee and 5G new radio standards.

Figure 2:
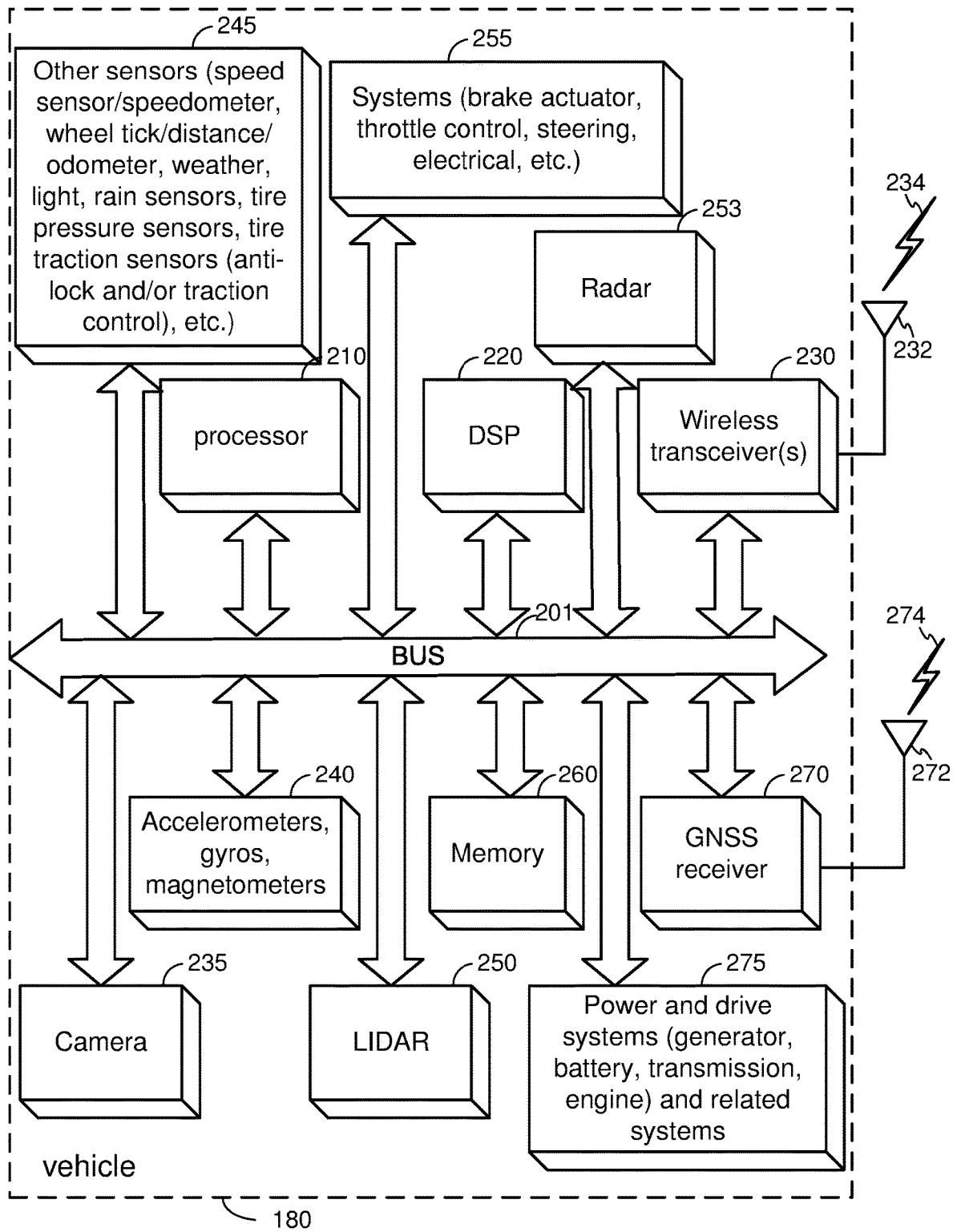
FIG. 2 is a block diagram illustrating an exemplary vehicle that may be used in the system shown in FIG. 1.

FIG. 2 is a block diagram of an example vehicle 180 that may be used in system 100. As shown in FIG. 2, in an embodiment, vehicle 180 may transmit radio signals to, and receive radio signals from, other vehicles, RSUs 125, mobile devices 102, and/or other devices or servers of system 100.

In one example, vehicle 180 may communicate with other vehicles or devices via wireless transceiver 230 and wireless antenna 232. In an embodiment, wireless transceiver(s) 230 may comprise various combinations of wide area network (WAN), wireless local area network (WLAN), and/or personal area network (PAN) transceivers. In an embodiment, a wireless transceiver 230 may also be a Bluetooth transceiver, a ZigBee transceiver, or other PAN transceiver. In an embodiment, vehicle 180 may contain multiple wireless transceivers including WAN, WLAN and/or PAN transceivers.

In an embodiment, vehicle 180 may be a rental vehicle or may be utilized for passenger or package transport (referred to herein as a "transport vehicle"), or may be usable for other purposes. In an embodiment, GNSS signals 274 from GNSS Satellites are utilized by vehicle 180 for location determination. In an embodiment, signals 234 from WAN transceiver(s), WLAN and/or PAN local transceivers are used for location determination, alone or in combination with GNSS signals 274.

Examples of network technologies that may support wireless transceivers 230 are Global System for Mobile Communications (GSM), Code Division Multiple Access (CDMA), Wideband CDMA (WCDMA), Long Term Evolution LTE), 5$^{th}$ Generation Wireless (5G) or New Radio Access Technology (NR), High Rate Packet Data (HRPD), and V2X car to car communication. V2X may be defined in various standards such as SAE, ETS-ITS standards. GSM, WCDMA and LTE are technologies defined by 3GPP. CDMA and HRPD are technologies defined by the 3$^{rd}$ Generation Partnership Project 2 (3GPP2). WCDMA is also part of the Universal Mobile Telecommunications System (UMTS) and may be supported by an HNB.

In an embodiment, vehicle 180 may include one or more cameras 235. In an embodiment, the cameras may each comprise a camera sensor and mounting assembly. The cameras may capture images of an environment proximate to the vehicle. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. The cameras may further be used for visual positioning to determine the location and/or the orientation of the vehicle 180, e.g., using extracted visual feature points from images that are compared to feature points in geo-referenced images. For example, the cameras may be used in conjunction with a coarse position determined from one or more of satellite positioning system ("SPS"), WAN and WLAN, in order to determine a precise location of the mobile device. For example, a coarse position may be used to obtain feature points from geo-reference images that may be compared to extracted feature points from images acquired by the cameras to obtain a precise location, which may be used for acquiring AR assistance data and alignment of AR assistance with image data. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modifying accordingly to update estimated parameters based on camera and other sensor measurements).

Accelerometers, gyros and magnetometers 240, in an embodiment, may be utilized to provide and/or verify motion and directional information. Accelerometers and gyros may be utilized to monitor wheel and drive train performance Accelerometers, in an embodiment, may also be utilized to verify actual time of impact with road hazards such as pot holes relative to predicted times based on existing stopping and acceleration models as well as steering models. Gyros and magnetometers may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors 245 such as speed sensors, wheel tick sensors, and/or odometer measurements.

Light detection and ranging (LIDAR) uses pulsed laser light to measure ranges to objects. While cameras may be used for object detection, LIDAR provides a means to detect the distances of the objects with more certainty, especially in regard to objects of unknown size and shape. LIDAR measurements may also be used to estimate stopping distance at different speeds and under varying conditions by providing accurate distance measurements and delta distance measurements, which may be, in an embodiment, measured during braking and/or acceleration to determine actual stopping distances and/or acceleration distances which may be utilized directly or may, perhaps more likely, utilized to calibrate predictive stopping, turning and acceleration models. For example, measurements taken of stopping distance and, perhaps also of stopping profile versus time and brake pressure, done at 25 miles per hour may be used as input to vary the estimate for stopping performance at other speeds, such as at 60 mph. These estimates could be done as estimates based on sensor measurements or as estimated variances off of or applied to a profile determined under reference conditions. Similar estimates may be done for acceleration and maneuverability to either tune a particular model or apply variances to a model to estimate performance under given road, environment and vehicular conditions.

Memory 260 may be connected to a processor 210 and/or DSP 220 via a bus 201. Memory 260 may comprise FLASH, RAM, ROM, disc drive, or FLASH card or other memory devices or various combinations thereof. In an embodiment, memory 260 may contain instructions to implement various methods described throughout this description. In an embodiment, memory may contain instructions for estimating stopping distance, maneuverability and acceleration parameters. In an embodiment, memory may contain instructions for operating and calibrating sensors, and for receiving map, weather, vehicular (both vehicle 180 and surrounding vehicles) and other data, and utilizing various internal and external sensor measurements and received data and measurements to determine performance parameters such as stopping distance, acceleration and turning radius at current speed and/or maneuverability at current speed and to determine operational parameters such as inter-car distance, turn initiation/timing and performance, and initiation/timing of merging operations into traffic.

In an embodiment, power and drive systems (generator, battery, transmission, engine) and related systems 275 and systems (brake, actuator, throttle control, steering, and electrical) 255 may be controlled by the processor(s) and/or hardware or software or by an operator of the vehicle or by some combination thereof. The systems (brake, actuator, throttle control, steering, electrical, etc.) 255 and power and drive or other systems 275 may be utilized in conjunction with performance parameters and operational parameters, to enable autonomously (and manually, relative to alerts and emergency overrides/braking/stopping) driving and operating a vehicle 180 safely and accurately, such as to safely, effectively and efficiently merge into traffic, stop, accelerate and otherwise operate vehicle 180.

A global navigation satellite system (GNSS) receiver 270 may be utilized to determine position relative to the earth (absolute position) and, when used with other information such as measurements from other objects and/or mapping data, to determine position relative to other objects such as relative to other cars and/or relative to the road surface. GNSS receiver 270 may include a GNSS antenna 272 to receive signals from GNSS satellites, such as satellites 110.

The GNSS receiver 270 may be used to determine location which may be utilized to calibrate other sensors, when appropriate, such as for determining distance between two time points in clear sky conditions and using the distance data to calibrate other sensors such as the odometer and/or LIDAR. GNSS doppler measurements may also be utilized to determine linear motion and rotational motion of the vehicle, which may be utilized in conjunction with gyro and/or magnetometer and other sensor systems to maintain calibration of those systems based upon measured location data.

Radio detection and ranging, radar 253, uses transmitted radio waves that are reflected off of objects. The reflected radio waves are analyzed, based on the time taken for reflections to arrive and other signal characteristics of the reflected waves to determine the location of nearby objects. Radar 253 may be utilized to detect the location of nearby cars, roadside objects (signs, other vehicles, pedestrians, etc.) and will generally enable detection of objects even if there is obscuring weather such as snow, rail or hail. Thus, radar 253 may be used to complement LIDAR 250 systems and camera 235 systems in providing ranging information to other objects by providing ranging and distance measurements and information when visual-based systems typically fail. Furthermore, radar 253 may be utilized to calibrate and/or sanity check other systems such as LIDAR 250 and camera 235. Ranging measurements from radar 253 may be utilized to determine/measure stopping distance at current speed, acceleration, maneuverability at current speed and/or turning radius at current speed and/or a measure of maneuverability at current speed.

An estimate of a location of a device (e.g., a vehicle or mobile device) may be referred to as a location, location estimate, location fix, fix, position, position estimate or position fix, and may be geographic, thus providing location coordinates for the vehicle (e.g., latitude and longitude) which may or may not include an altitude component (e.g., height above sea level, height above or depth below ground level, floor level or basement level). Alternatively, a location of a vehicle or mobile device may be expressed as a civic location (e.g., as a postal address or the designation of some point or small area in a building such as a particular room or floor). A location of a vehicle or mobile device may also be expressed as an area or volume (defined either geographically or in civic form) within which the vehicle or mobile device is expected to be located with some probability or confidence level (e.g., 67% or 95%). A location of a vehicle or mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Figure 3:
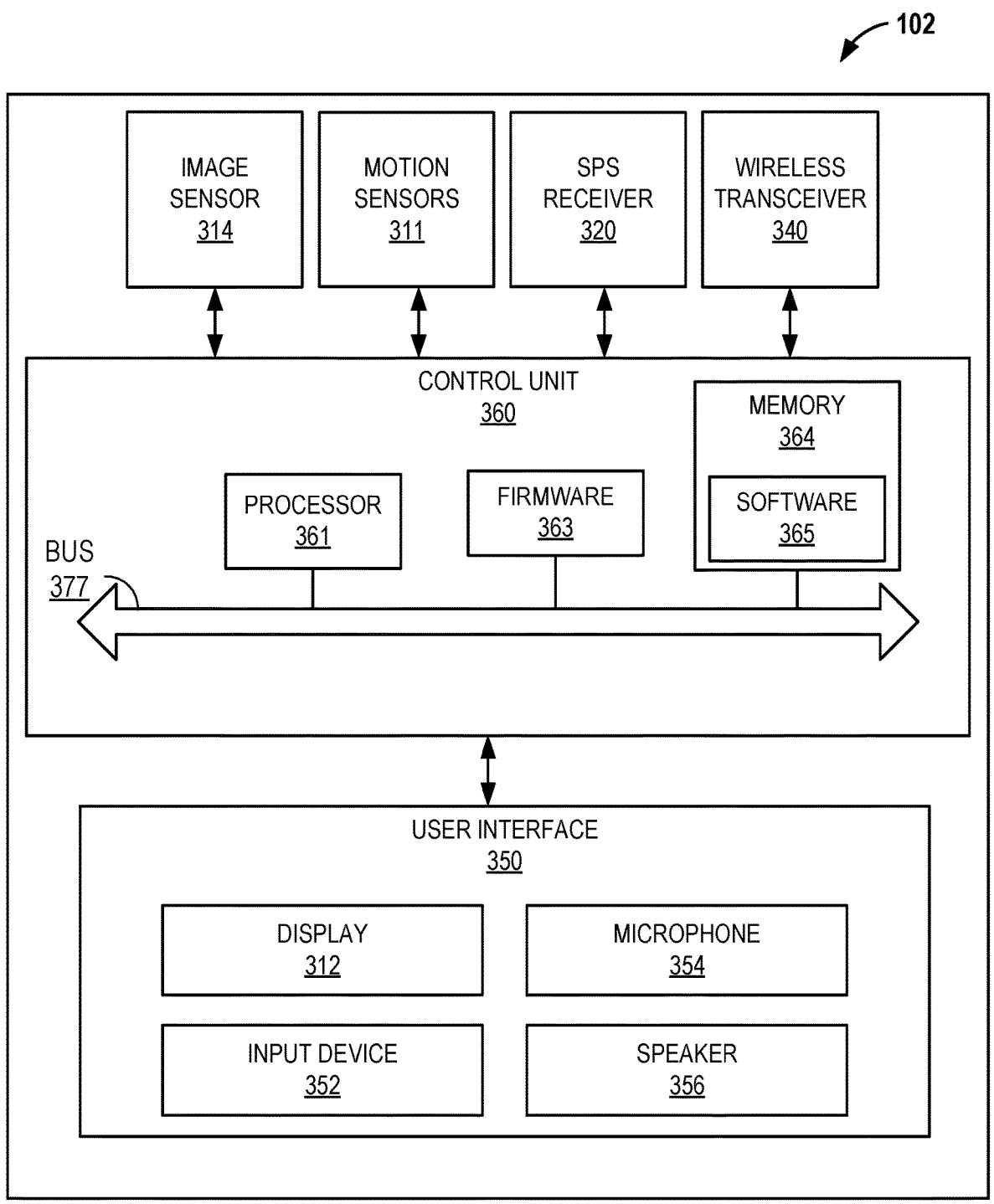
FIG. 3 is a block diagram illustrating an example mobile device that may be used in the system shown in FIG. 1.

FIG. 3 is a block diagram of an example mobile device 102 that may be used with system 100 (shown in FIG. 1). In some aspects, mobile device 102 may be used to request and/or provide augmented reality (AR) assistance in relation to rental or transport vehicles. As used herein, the general term "vehicle" encompasses both rental vehicles and transport vehicles described herein.

Mobile device 102 may be one of a variety of devices that provides AR functionality to a user. For example, mobile device 102 may be a smart phone, an AR headset or glasses, a wearable device such as a smart watch, a laptop computer, a tablet computing device, or any other suitable device that is mobile. In some examples, mobile device 102 may be integrated into a vehicle, such as vehicle 180 (shown in FIG. 2) as an onboard unit (OBU) or similar.

In the example shown in FIG. 3, mobile device 102 is an augmented reality (AR) device 102. Mobile device 102 may be a device that is wearable over the eyes of a user, such as smart eyeglasses, headgear, or the like. Alternatively, mobile device 102 may be worn or held by the user in such a way that the device is able to detect objects within the field of view of the device. Mobile device 102 may include a control unit 360 that includes a processor 361, which may be at more than one processor, and a memory 364 coupled to one or more busses 377 or signal lines. Control unit 360 and/or processor 361 can be configured, e.g., via firmware 363, software 365 shown in memory 364, or hardware, to implement methods of requesting and providing AR assistance relating to vehicle location management, parking management for rental vehicles, or passenger pickup management for transport vehicles as described herein.

Mobile device 102 can include an image sensor 314 for capturing an image and generating resulting image data. For example, image sensor 314 may capture images of an environment proximate to mobile device 102, either automatically during operation of mobile device 102 or upon activation by the user. Image sensor 314 may be incorporated into a front-facing camera in some aspects, and another image sensor 314 may be incorporated into a rear-facing camera in some aspects Image sensor 314 may capture still images and videos of the environment within the field of view (FOV) of image sensor 314, and may transmit the images and videos to memory 364 for storage therein.

Furthermore, as an illustrative example, memory 364 may store instructions which when executed by processor 361, can create regions of interest in images captured by image sensor 314, can identify objects within the images, and can overlay data or other images onto the images captured by image sensor 314.

Mobile device 102 may optionally include motion sensors 311, such as accelerometers, gyroscopes, electronic compass, or other similar motion sensing elements.

Mobile device 102 may optionally include an SPS receiver 320 for acquiring signals from an SPS and to determine a location of the mobile device 102.

Mobile device 102 may further include a user interface 350 that includes a display 312 for displaying an augmented reality image. User interface 350 may also include an input device 352, such as a keyboard, keypad, gesture recognition system, or other input device through which the user can input information into mobile device 102. User interface 350 may also include a microphone 354 and speaker 356. Mobile device 102 may include other components not illustrated in FIG. 3, such as a satellite position system receiver, power device (e.g., a battery), as well as other components typically associated with portable and non-portable electronic devices.

Mobile device 102 may include a wireless transceiver 340 that may communicate via one or more wireless communication links through a wireless network based on or otherwise supporting any suitable wireless communication technology. Accordingly, transceiver 340 enables mobile device 102 to communicate with another device that is separate from device 102. For example, transceiver 340 may enable mobile device 102 to communicate with a vehicle, a co-located device such as a wearable device (e.g., a smart watch), a cellular phone, one or more servers (such as parking location server 155, rental management server 145, location server 160, or map server 150), and/or any other device that is separate from mobile device 102. Transceiver 340 may communicate over a wide area network such as the Internet or a cellular network, over a local area network, and/or over body area network, for example.

For example, in some aspects, mobile device 102 may communicate with a wireless network. In some aspects, the network may comprise a body area network or a personal area network. In some aspects, the network may comprise a local area network or a wide area network. Mobile device 102 may support or otherwise use one or more of a variety of wireless communication technologies, protocols, or standards such as, for example, 3G, LTE, Advanced LTE, 4G, 5G new radio (NR), narrowband IoT (NB-IoT), CDMA, TDMA, OFDM, OFDMA, WiMAX, ultra-wideband (UWB), and Wi-Fi. Similarly, mobile device 102 may support or otherwise use one or more of a variety of corresponding modulation or multiplexing schemes. Mobile device 102 may wirelessly communicate with other mobile devices, cell phones, other wired and wireless computers, Internet web sites, etc.

In some aspects, mobile device 102 is a dedicated augmented reality (AR) device, game device, or other device with AR processing and display capabilities. In an AR context, a user may use mobile device 102 to view a representation of the real world through display 312 of device 102. A user may interact with mobile device 102 by using image sensor 314 to receive real world images or video and process the images or video in a way that superimposes additional or alternate information onto the displayed real world images/video on the device. As a user views an AR implementation on mobile device 102, real world objects or scenes may be replaced or altered in real time on display 312. Virtual objects (e.g., text, images, video) may be inserted into the representation of a scene depicted on a device display.

In one example, processor 361 may display real-time video data of the environment proximate to mobile device 102 (e.g., the portion of the environment within the FOV of image sensor 314). Alternatively, display 312 may be partially transparent (for example with AR glasses) such that the user may see the real-time views of the environment within the FOV of display 312. In either situation, processor 361 may overlay additional image data on display 312 so that the additional image data is viewable over a portion of the real-time environment images. As described more fully herein, in one example, the additional image data includes AR assistance images or other data that indicates allowed parking areas, prohibited parking areas, incentivized parking areas, allowed passenger loading areas, prohibited passenger loading areas, and/or incentivized passenger loading areas.

As described herein, image sensor 314 may be integrated into mobile device 102. However, in some aspects, image sensor 314 may be embodied in a camera external to mobile device 102 (e.g., a remote camera 175) that is wirelessly connected to mobile device 102. Examples in which a camera is wirelessly connected to mobile device 102 may include cameras installed by a city on one or more buildings, airports, or the like, cameras worn by other users or incorporated into other mobile devices (such as for crowd sourcing image or video data), and/or any other suitable camera. In such examples, mobile device 102 may receive image and video data from the external camera or cameras. In other aspects, mobile device 102 (and other users' mobile devices) may transmit image and video data captured from image sensor 314 and/or the external cameras and transmit the data to one or more servers to crowd source image and video data of the environment.

Figure 4:
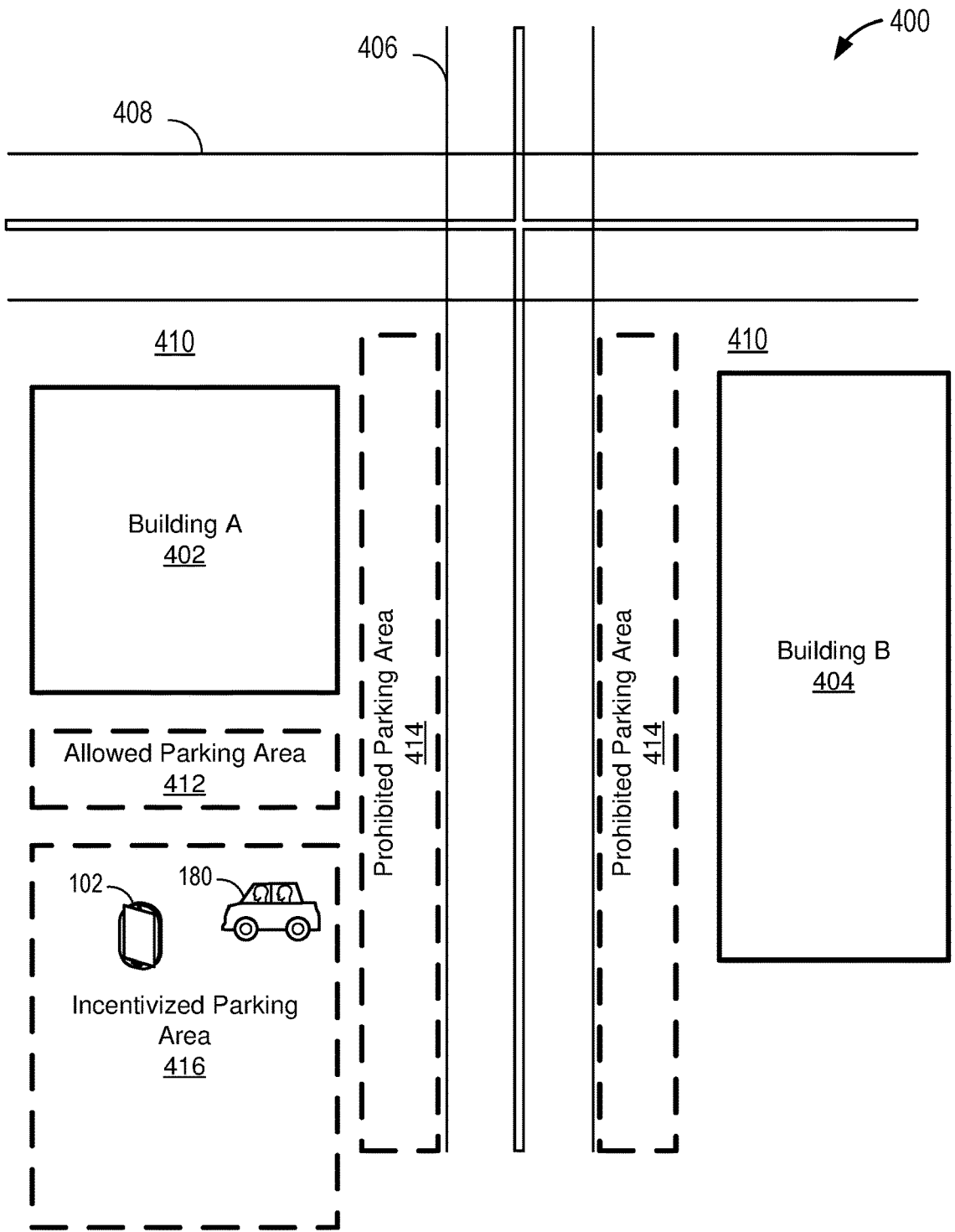
FIG. 4 illustrates an exemplary environment in which a mobile device and vehicle may be located.

FIG. 4 is a block diagram of an example environment 400 that a mobile device 102 and vehicle 180 may be located within. In the example shown in FIG. 4, a first building 402 (Building A) and a second building 404 (Building B) are located along opposite sides of a first street 406 with a second street 408 perpendicular to first street 406. Sidewalks 410 are located between the buildings and the streets.

In order to reduce congestion along sidewalks 410 or to otherwise maintain pedestrian access to buildings 402 and 404, for example, different areas of environment 400 are designated as having different parking authorizations. In a first parking area 412, parking of vehicles (such as rental vehicles described above) is allowed or authorized due to one or more rules of the jurisdiction or jurisdictions ("local rules") covering environment 400. Accordingly, first parking area 412 may be referred to as an allowed parking area 412. In a second parking area 414, parking of vehicles is disallowed or unauthorized due to the local rules. Accordingly, second parking area 414 may be referred to as a prohibited parking area 414.

In a third parking area 416, parking of vehicles is allowed and is incentivized. Accordingly, third parking area 416 may be referred to as an incentivized parking area 416. In other words, a user may be incentivized to park a vehicle in incentivized parking area 416 as compared to parking the vehicle in allowed parking area 412. The incentivization of parking in incentivized parking area 416 may be accomplished in various ways by various entities. Examples of incentivization for parking in incentivized parking area 416 may include providing a monetary reward, reducing a rental cost of the rental vehicle, providing a discount for one or more goods or services, providing early admission or priority entrance to an event, and/or any other suitable incentive. Examples of entities that may provide the incentive include a parking provider, a rental vehicle provider, an event producer or provider, a city or other governmental entity, and/or any other suitable entity.

The incentives may be provided to the user's mobile device 102 and/or an account linked to the user or device 102 through rental management server 145, for example, or any other suitable server or device.

The local rules and data representative of the parking areas (e.g., first parking area 412, second parking area 414, and third parking area 416) may be provided to the user's mobile device 102 and/or vehicle in a variety of ways. In one aspect, the local rules and/or data representative of the areas may be stored in memory 364 of mobile device 102, and may be provided to processor 361 from memory 364 when a request for AR assistance is made by mobile device 102. In another aspect, local rules and/or data representative of the areas may be stored in parking location server 155 (or a memory accessible by parking location server 155), and may be provided to processor 361 from parking location server 155 when a request for AR assistance is made by mobile device 102. Alternatively, local rules and/or data representative of the areas may be stored in any other suitable location and may be provided to mobile device 102 when a request for AR assistance is made by mobile device 102.

As discussed herein, the parking areas may be displayed to the user via mobile device 102 as AR assistance data. The AR assistance data may be displayed to the user by identifying one or more parking areas of environment 400 in display 312 of mobile device 102 and displaying the parking area in a different color than the other portions of environment 400 within display, by displaying a bounding box around the parking area, and/or by other suitable visual indicators. In one aspect, an arrow or directional indicator may be displayed to guide the user to an allowable or incentivized parking area.

While FIG. 4 illustrates and describes a variety of parking areas in an environment 400 that may be displayed to a user as AR assistance data, it should be recognized that the AR assistance data may be provided for other types of areas as well. For example, the AR assistance data may identify and display allowable passenger loading areas, prohibited passenger loading areas, and/or incentivized passenger loading areas for use with passengers of transport vehicles in a similar manner as described above.

Figure 5:
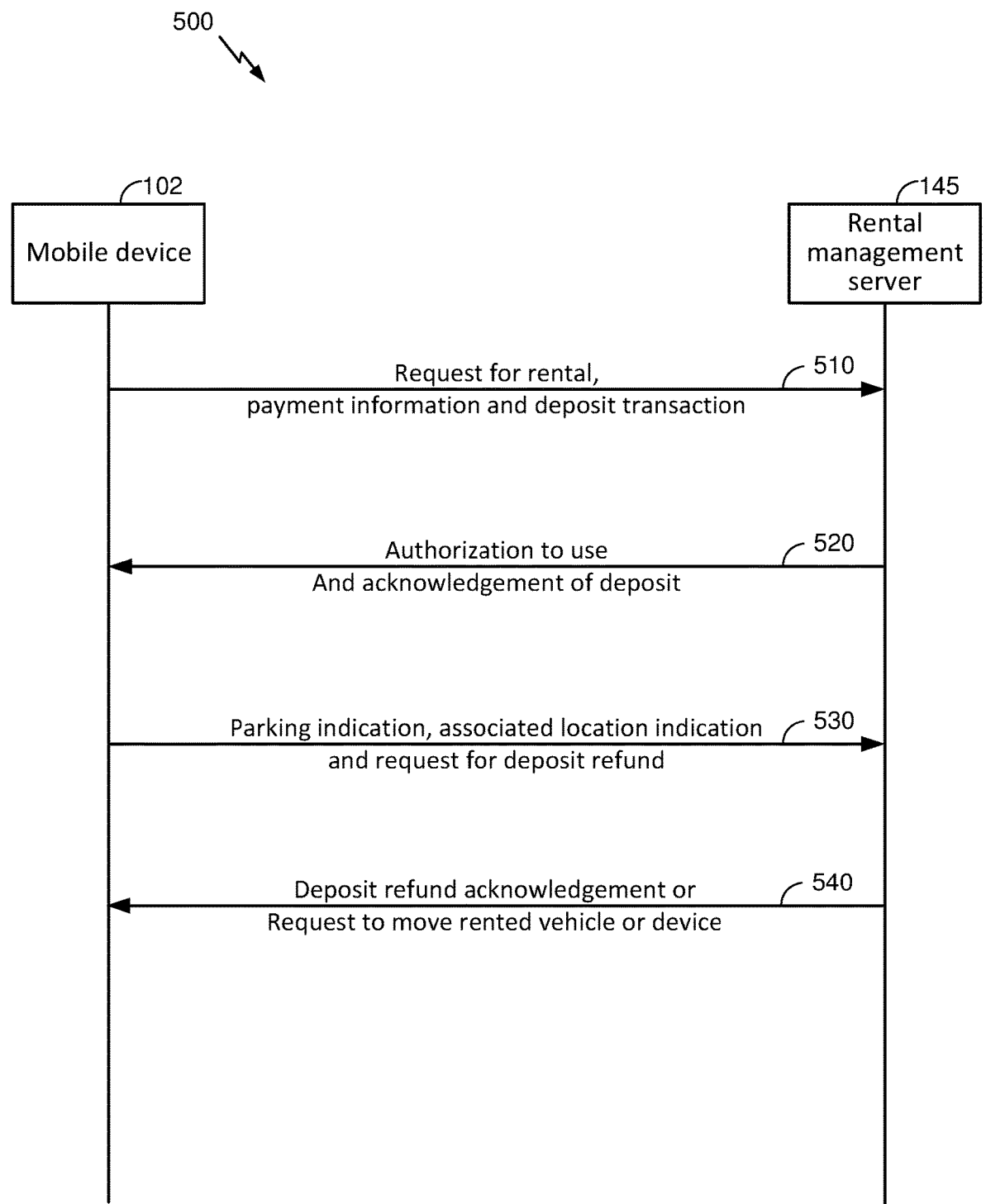
FIG. 5 illustrates an exemplary sequence diagram for requesting the rental of a transportation device and request for a refund of deposit contingent on parking information.

FIG. 5 is a sequence diagram 500 illustrating an example flow for requesting a rental of a transportation device (e.g., a rental vehicle) and request for a refund of deposit contingent on parking information. In the example shown in FIG. 5, the request for rental and the request for refund are transmitted from a mobile device 102 to a rental management server 145. However, it should be recognized that the request for rental and/or refund may be transmitted by a vehicle or another device operated by the user, and a different server may be used to service the requests.

In the example shown in FIG. 5, mobile device 102 transmits a request for rental of a vehicle to rental management server 145 at flow 510. The request for rental may include, for example, payment information and a deposit transaction. The payment information and the deposit transaction may include or may be authorizations to deduct a rental payment and a rental deposit from an account of a user who will be renting the vehicle or paying for the rental.

At flow 520, rental management server 145 may transmit an authorization to use the rental vehicle to mobile device 102. The authorization may include an acknowledgement of the deposit received by rental management server 145. The user may then use the vehicle in accordance with the rental agreement.

After the user is finished using the rental vehicle, the user may park the vehicle and may initiate a deregistration or rental completion procedure. As part of this procedure, at flow 530, mobile device 102 may transmit a parking indication to rental management server 145 indicating that the rental vehicle is parked, a location indication that identifies the location of the rental vehicle, and a request for refund of the deposit. The location indication may include an indication of a type and/or identifier of a parking area in which the vehicle is parked (e.g., allowed parking area, prohibited parking area, or incentivized parking area).

At flow 540, rental management server 145 may transmit a deposit refund acknowledgement upon a determination that the vehicle is parked in an appropriate area (e.g., an allowed or incentivized area). However, upon a determination that the vehicle is parked in an inappropriate area (e.g., a prohibited parking area), rental management server 145 may transmit a request to move the vehicle to an appropriate area. The flow may return to flow 530 and continue until the vehicle is parked in an appropriate area.

Figure 6A:
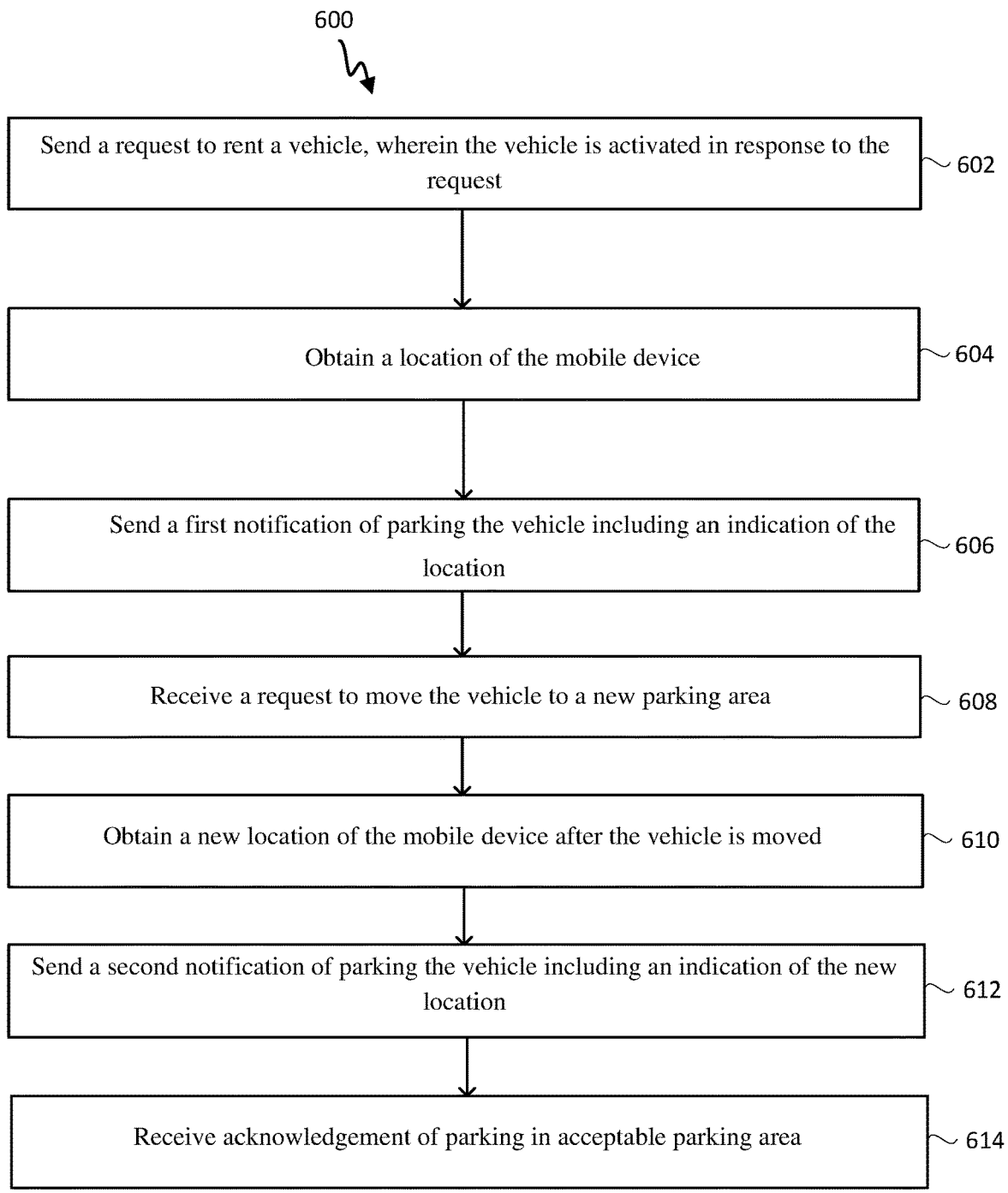
FIG. 6A is a flowchart illustrating an exemplary method for requesting and managing a transportation device rental from a mobile device.

FIG. 6A is a flowchart illustrating an example method 600 for supporting vehicle parking management using a mobile device. In one example, method 600 may be implemented by at least one processor 361 of mobile device 102. For example, each block of method 600 may be embodied as processor-executable instructions that when executed by at least one processor 361, cause the at least one processor 361 to perform the functions of each block.

At block 602, mobile device 102 sends a request to rent a vehicle, where the vehicle is activated in response to the request. The request, for example, may be sent to a rental management server 145, for example. In some implementation, the user may already be registered with the rental management server 145, and thus, a registration process including providing identification and credit card information or other payment information may not be necessary. In other implementations, e.g., for a first time rental, the user may be prompted to provide identification and credit card or other types of payment information. The request may be sent in response to the user selecting a rental icon or selector on user interface 350 of mobile device 102, for example, or by voice or gesture command recognized by user interface 350. One or more additional functions may occur in response to sending the request to rent the vehicle. For example, the mobile device 102 may receive various terms that must be accepted by the user, e.g., via the prompt, before activation of the vehicle, such as one or more of the rental rate, liability waive, and incentive information for parking management. By way of example, the incentive information may include pecuniary and/or non-pecuniary incentives. Examples of pecuniary incentives for parking management may include, e.g., the return of a deposit, a decrease in rental rate, waiving of additional charges, etc. Examples of non-pecuniary incentives for parking management may include, e.g., continued good standing to rent vehicles, priority access to rental vehicles. Once the vehicle is activated, the user may use the vehicle, e.g., for transportation. A means for sending a request to rent a vehicle, where the vehicle is activated in response to the request, may include, e.g., the wireless transceiver 340.

After using the vehicle, the user may wish to return the vehicle to the rental agency or other entity operating rental management server 145. Accordingly, at block 604, mobile device 102 may obtain its location and at block 606, the mobile device may transmit a notification of parking the vehicle that includes an indication of the location of the vehicle, as described below.

At block 604, a location of the mobile device 102 may be obtained. In one example, mobile device 102 obtains its own location by using assisted GNSS methods or other mobile device-based positioning methods (sometimes referred to as UE-based positioning methods). In one example, the location of the mobile device may be a coarse location of the mobile device, and a precise location of the mobile device may be obtained based on the one or more images of an environment and positioning based on one or more of a satellite positioning system, a wireless wide area network, a wireless local area network, or a combination thereof. In another example, mobile device 102 may obtain its location from location server 160, RSU 125, another mobile device, a base station 120, access point 130, or from another suitable location-determining device. In one embodiment, processor 361 of mobile device 102 may be a means for obtaining a location of the apparatus (i.e., mobile device 102). In other embodiments, wireless transceiver 340 of mobile device 102 may be the means for obtaining the location of the apparatus. In other embodiments, wireless transceiver 340 and/or SPS receiver 320 of mobile device 102 may be the means for obtaining the coarse location of the apparatus and the image sensor 314 along with, e.g., the wireless transceiver 340 and/or SPS receiver 320 of mobile device 102 may be the means for obtaining the precise location of the apparatus.

At block 606, mobile device 102 may send a first notification of parking the vehicle that includes an indication of the location of the vehicle to the rental management server 145. A means for sending a first notification of parking the vehicle, may include, e.g., the wireless transceiver 340.

If the vehicle is parked in an acceptable parking area, the transaction may be complete. For example, if rental management server 145 approves the indication of parking, mobile device 102 may receive from rental management server 145 an acknowledgement of parking the vehicle in an acceptable parking area. An incentive, whether pecuniary or non-pecuniary, for the parking management, i.e., to park the vehicle in an acceptable parking area, may be applied and in some implementations the mobile device 102 may receive an indication of the application of the incentive.

At block 608, if the parking location of the vehicle is unacceptable, the mobile device 102 may receive a request from rental management server 145 to move the vehicle to a new parking area. In some implementations, the request to move the vehicle to a new parking area may include an incentive to move the vehicle. As discussed above, the incentive may be pecuniary, non-pecuniary, or a combination thereof. For example, a pecuniary incentive may include, e.g., the return of a deposit, a decrease in rental rate, waiving of additional charges, etc. Examples of non-pecuniary incentives for parking management may include, e.g., continued good standing to rent vehicles, priority access to rental vehicles. For example, the non-pecuniary incentive may include an indication that the user will be temporally or permanently prohibited from using the vehicle rental service, if the user does not move the vehicle to a new parking area. Additionally, the request to move the vehicle to a new parking area may include an identification of the acceptable parking area. The acceptable parking area for example, may be identified as a different location or as an adjustment of the parking position e.g., to place the vehicle out of the way of traffic. In some implementations, the mobile device may display augmented reality (AR) assistance based on the identification of the acceptable parking area. A means for displaying augmented reality (AR) assistance based on the identification of the acceptable parking area, for example, may include the display 312,which visually indicates the acceptable parking area. A means for receiving a request to move the vehicle to a new parking area, may include, e.g., the wireless transceiver 340.

At block 610, a new location of the mobile device may be obtained, e.g., after the user moves the vehicle in response to the request to move the vehicle to a new parking area. The new location of the mobile device may be obtained in the same manner as discussed in block 604, discussed above.

At block 612, mobile device 102 may send a second notification of parking the vehicle that includes an indication of the new location of the vehicle to the rental management server 145, similar to block 606 discussed above.

At block 614, if rental management server 145 approves the indication of parking, mobile device 102 may receive from rental management server 145 an acknowledgement of parking the vehicle in an acceptable parking area. An incentive, whether pecuniary or non-pecuniary, for the parking management, i.e., to park the vehicle in an acceptable parking area, may be applied and in some implementations the mobile device 102 may receive an indication of the application of the incentive.

Figure 6B:
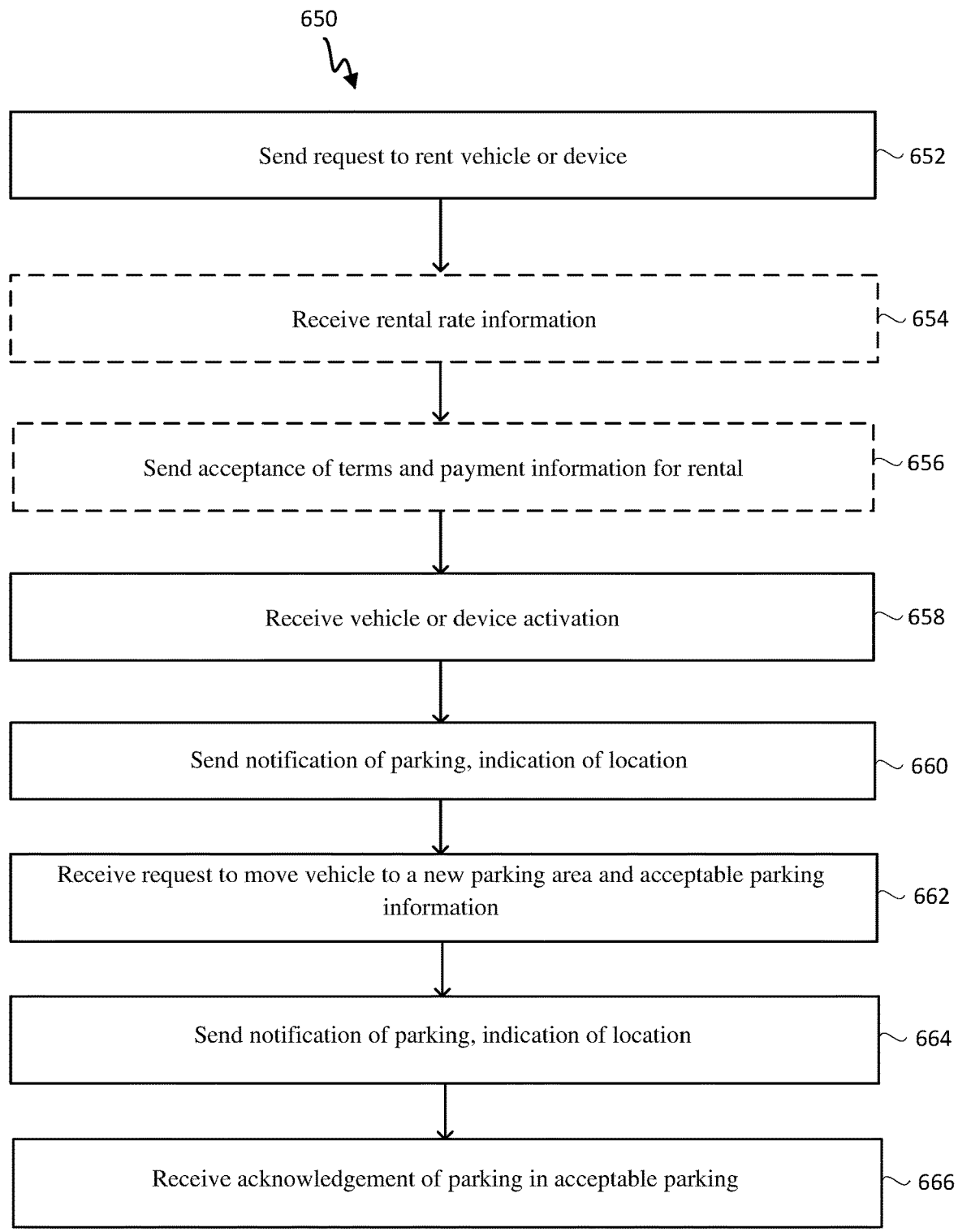
FIG. 6B is a flowchart illustrating an exemplary method for requesting and managing a transportation device rental from a mobile device.

FIG. 6B is a flowchart illustrating a more detailed example method 650 for supporting vehicle parking management using a mobile device, that includes requesting a rental of a transportation device (e.g., a rental vehicle) and being incentivized to park in an acceptable parking area. In one example, method 650 is implemented by at least one processor 361 of mobile device 102. For example, each block of method 650 may be embodied as processor-executable instructions that when executed by at least one processor 361, cause at least one processor 361 to perform the functions of each block.

At block 652, mobile device 102 sends a request to rent a vehicle or other device to rental management server 145, for example. The request may be sent in response to the user selecting a rental icon or selector on user interface 350 of mobile device 102, for example, or by voice or gesture command recognized by user interface 350.

At block 654, which is optional as illustrated with dotted lines, mobile device 102 may receive rental rate information. In some implementations, the mobile device 102 may receive an information of an incentive for parking management, which in one example, may be information related to a required deposit amount from rental management server 145.

At optional block 656, mobile device 102 may send acceptance of terms (e.g., rental rate and incentive (e.g., deposit amount)). If the mobile device 102 is not pre-registered with the rental management server 145, the mobile device may provide payment information for the rental and deposit. The payment information and the deposit may include an authorization to deduct the payment and the deposit from an account of the user.

At block 658, mobile device 102 may receive vehicle or device activation form rental management server 145. The activation may include an activation code, key, or certificate that can be used to unlock or otherwise access the vehicle or device. In an alternative embodiment, the activation may be sent directly to the vehicle or other device by rental management server 145.

By way of example, blocks 652, 654, 656, and 658, may all be included in block 602 shown in FIG. 6A.

After using the vehicle or device, the user may wish to return the vehicle to the rental agency or other entity operating rental management server 145. Accordingly, at block 660, mobile device 102 may transmit a notification of parking the vehicle, an indication of the location of the vehicle. In some implementations, the mobile device 102 may transmit a request for application of the incentive, such as a request for deposit refund to rental management server 145.

At block 662, if the parking location of the vehicle is unacceptable, mobile device 102 may receive a request from rental management server 145 to move the vehicle to a new parking area and may also receive acceptable parking information from rental management server 145 and/or parking location server 155. The acceptable parking information may be received and/or presented to the user as AR assistance as described herein.

At block 664, mobile device 102 may send a second notification of parking the vehicle, a second indication of the location of the vehicle. In some implementations, the mobile device may send a second request for application of the incentive, such as a deposit refund to rental management server 145.

At block 666, if rental management server 145 approves the indication of parking, mobile device 102 may receive from rental management server 145 an acknowledgement of parking the vehicle in an acceptable parking area. In some implementations, the mobile device 102 may receive an indication of the application of the incentive, such as the return of a deposit refund. The deposit refund may be sent to mobile device 102 or to an account owned by the user of mobile device 102 in some embodiments, with a receipt or acknowledgement of the deposit refund being sent to mobile device 102.

Figure 7A:
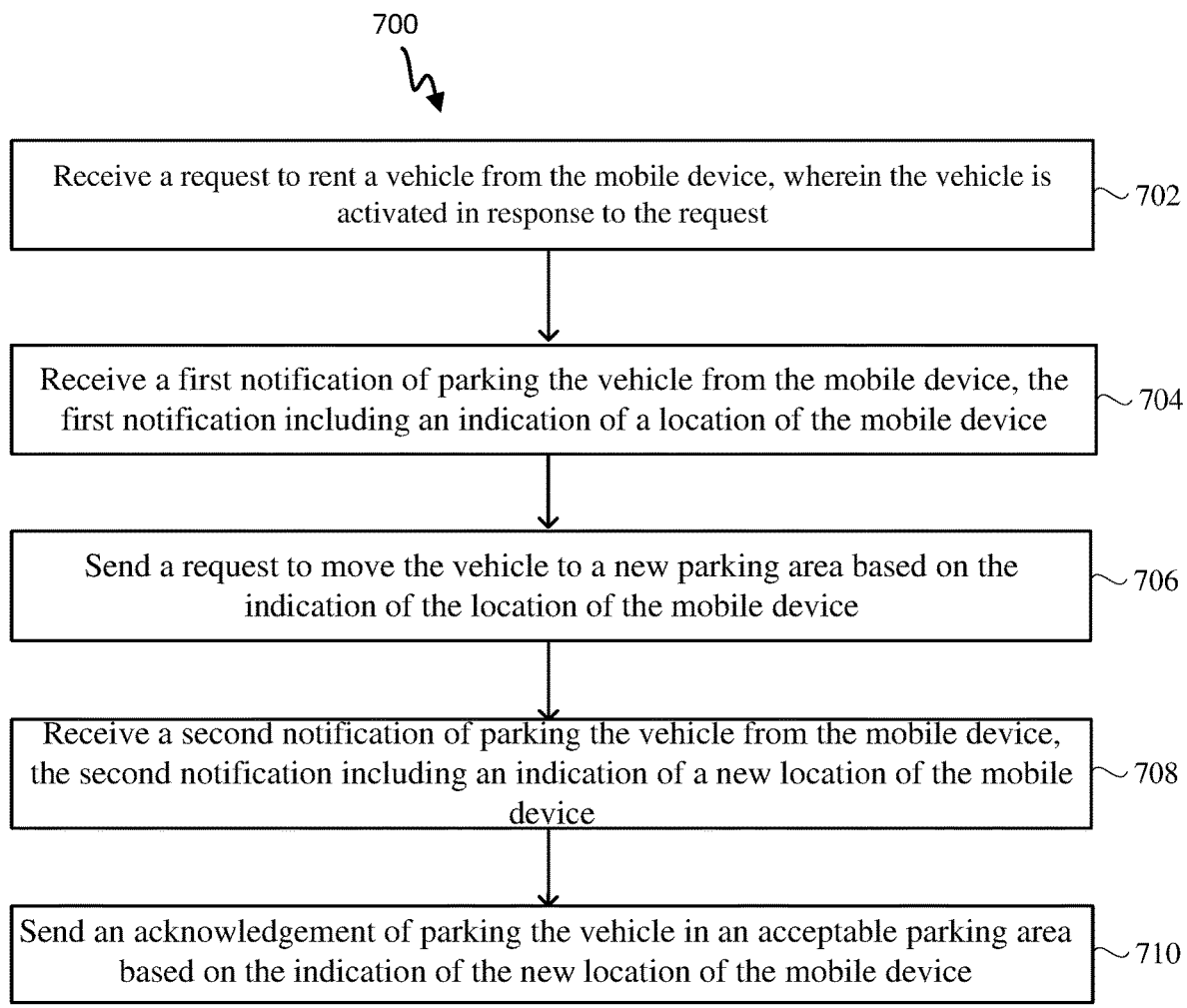
FIG. 7A is a flowchart illustrating an exemplary method for managing transportation device rentals from a server.

FIG. 7A is a flowchart illustrating an example method 700 for supporting vehicle parking management using a mobile device. In one example, method 700 is implemented by a at least one processor of rental management server 145. For example, each block of method 700 may be embodied as processor-executable instructions that when executed by the processor, cause the processor to perform the functions of each block.

At block 702, the rental management server 145 may receive a request to rent a vehicle from the mobile device 102 of a user, wherein the vehicle is activated in response to the request. In some implementation, the user may already be registered with the rental management server 145, and thus, a registration process including providing identification and credit card information or other payment information may not be necessary. In other implementations, e.g., for a first time rental, rental management server 145 may send a message to the mobile device 102 to prompt the user to provide identification and credit card or other types of payment information. One or more additional functions may occur in response to receiving the request to rent the vehicle. For example, the rental management server 145 may send various terms to the mobile device 102 that must be accepted by the user, e.g., via the prompt, before activation of the vehicle, such as one or more of the rental rate, liability waive, and incentive information for parking management. By way of example, the incentive information may include pecuniary and/or non-pecuniary incentives. Examples of pecuniary incentives for parking management may include, e.g., the return of a deposit, a decrease in rental rate, waiving of additional charges, etc. Examples of non-pecuniary incentives for parking management may include, e.g., continued good standing to rent vehicles, priority access to rental vehicles. Once the vehicle is activated, the user may use the vehicle, e.g., for transportation. A means for receiving a request to rent a vehicle, where the vehicle is activated in response to the request, may include, e.g., the network interface of the rental management server 145.

At block 704, after the user is finished using the rental vehicle, the rental management server 145 may receive a first notification of parking the vehicle from the mobile device 102, the first notification including an indication of a location of the mobile device. A means for receiving a first notification of parking the vehicle from the mobile device 102 may include, e.g., the network interface of the rental management server 145.

At block 706, if the location of the vehicle is not acceptable (e.g., the vehicle is parked in an unacceptable location) based on the indication of the location of the mobile device, rental management server 145 may send a request to move the vehicle to a new parking area. In one embodiment, rental management server 145 may receive the acceptable parking information from parking location server 155. The request to move the vehicle to a new parking area may include an incentive to move the vehicle. As discussed above, the incentive may be pecuniary, non-pecuniary, or a combination thereof. For example, a pecuniary incentive may include, e.g., the return of a deposit, a decrease in rental rate, waiving of additional charges, etc. Examples of non-pecuniary incentives for parking management may include, e.g., continued good standing to rent vehicles, priority access to rental vehicles. For example, the non-pecuniary incentive may include an indication that the user will be temporally or permanently prohibited from using the vehicle rental service, if the user does not move the vehicle to a new parking area. Additionally, the request to move the vehicle to a new parking area may include an identification of the acceptable parking area. The acceptable parking area for example, may be identified as a different location or as an adjustment of the parking position e.g., to place the vehicle out of the way of traffic. A means for sending a request to move the vehicle to a new parking area based on the indication of the location of the mobile device may include, e.g., the network interface of the rental management server 145.

At block 708, rental management server 145 may receive a second notification of parking the vehicle from the mobile device, the second notification including an indication of a new location of the mobile device. A means for receiving a second notification of parking the vehicle from the mobile device may include, e.g., the network interface of the rental management server 145.

At block 710, if the new parking location is acceptable as determined based on the indication of the new location of the mobile device, rental management server 145 may send an acknowledgement of parking the vehicle in an acceptable parking area. A means for sending an acknowledgement of parking the vehicle in an acceptable parking area may include, e.g., the network interface of the rental management server 145.

Figure 7B:
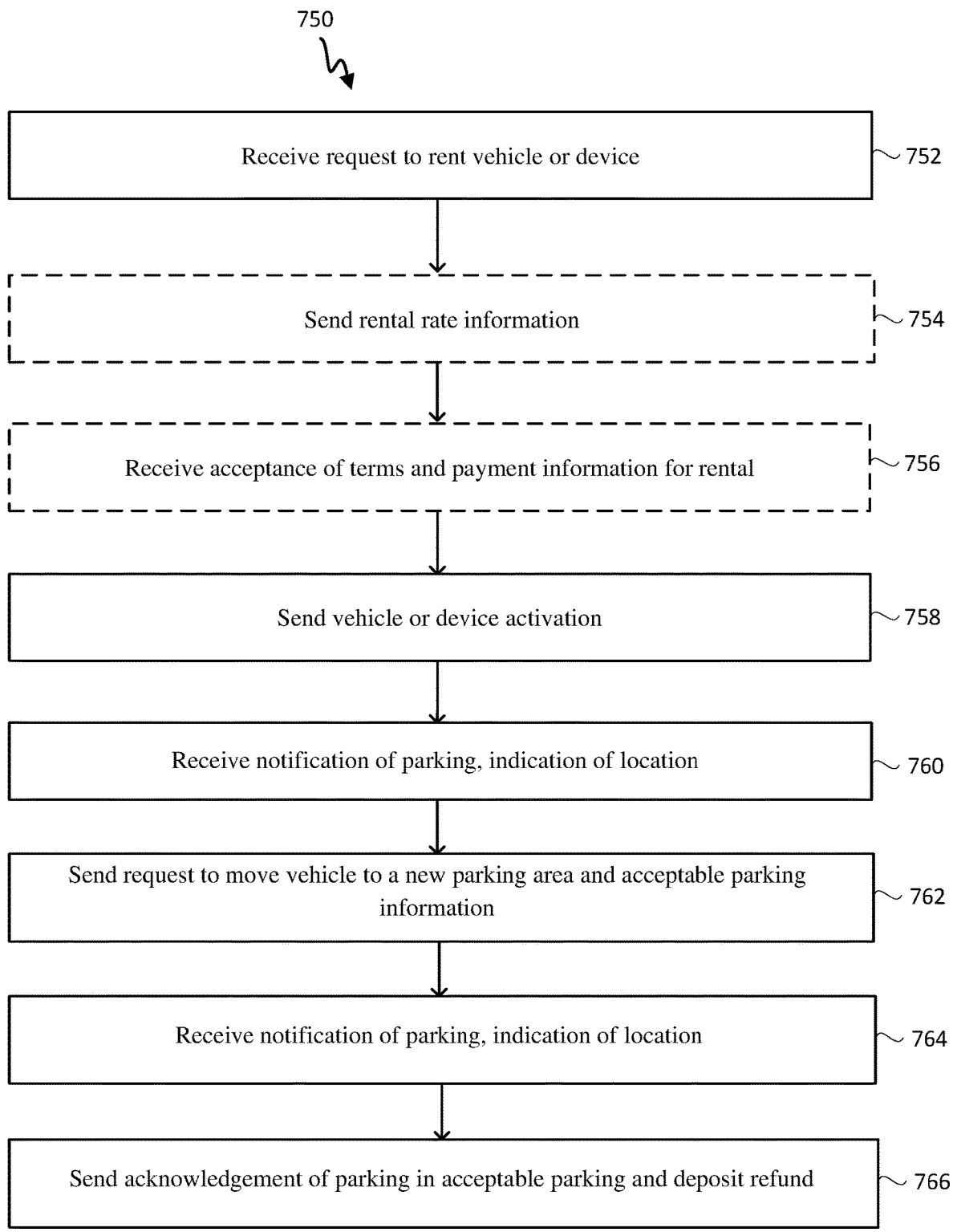
FIG. 7B is a flowchart illustrating an exemplary method for managing transportation device rentals from a server.

FIG. 7B is a flowchart illustrating an example method 750 for supporting vehicle parking management using a mobile device, that includes receiving a request for rental of a transportation device (e.g., a rental vehicle) and providing an incentive to park in an acceptable parking area. In one example, method 750 is implemented by at least one processor of rental management server 145. For example, each block of method 750 may be embodied as processor-executable instructions that when executed by the at least one processor, cause the at least one processor to perform the functions of each block.

At block 752, rental management server 145 may receive a request to rent a vehicle or other device from mobile device 102 of a user, for example.

At block 754, which is optional as illustrated with dotted lines, rental management server 145 may send rental rate information. In some implementations, the rental management server 145 may send information of an incentive for parking management, which in one example, may be information related to a required deposit amount to mobile device 102.

At optional block 756, rental management server 145 may receive acceptance of terms (e.g., rental rate and incentive (e.g., deposit amount)). If the mobile device 102 is not pre-registered with the rental management server 145, the mobile device 102 may provide payment information for the rental and deposit.

At block 758, rental management server 145 may send vehicle or device activation to mobile device 102. The activation may include an activation code, key, or certificate that can be used to unlock or otherwise access the vehicle or device. In an alternative embodiment, the activation may be sent directly to the vehicle or other device by rental management server 145.

By way of example, blocks 752, 754, 756, and 758, may all be included in block 702 shown in FIG. 7A.

At block 760, after the user is finished using the rental vehicle, rental management server 145 may receive a notification of parking the vehicle, an indication of the location of the vehicle. In some implementations, the rental management server 145 may receive a request for application of the incentive, such as a request for deposit refund from mobile device 102.

At block 762, if the location of the vehicle is not acceptable (e.g., the vehicle is parked in an unacceptable location), rental management server 145 may send a request to move the vehicle to a new parking area and may also send acceptable parking information to mobile device. In one embodiment, rental management server 145 may receive the acceptable parking information from parking location server 155.

At block 764, rental management server 145 may receive a new (second) notification of parking the vehicle, indication of the location of the vehicle. In some implementations, the rental management server 145 may receive a second request for application of the incentive, such as a deposit refund from mobile device 102.

At block 766, if the new parking location is acceptable, rental management server 145 may send an acknowledgement of the parking of the vehicle in acceptable parking. In some implementations, the rental management server 145 may send an indication of the application of the incentive, such as the return of a deposit refund (or receipt of the deposit refund) to mobile device 102.

While FIG. 6A, 6B and FIG. 7A, 7B have been described with reference to rental vehicle management, it should be recognized that the methods may also be used for ride-sharing or taxi services. For example, a user may request a ride via an application on mobile device 102. Mobile device 102 may receive the rate information and terms for the ride, and may send acceptance of those terms to a server managing the ride service. Mobile device 102 may identify areas in the environment proximate to mobile device 102 in which the passenger may wait for the vehicle to arrive (e.g., passenger loading areas described herein) in response to local rules, for example. The areas and/or local rules may be stored within mobile device 102 and/or may be received from one or more servers. Mobile device 102 may also obtain AR assistance to enable the user to view the passenger loading areas.

In one aspect, a server or other device may determine whether the user and/or mobile device 102 is located within the allowable area for passenger pickup (e.g., within allowed passenger loading area or incentivized passenger loading area). For example, the ride service server may determine whether the user is located within the allowable area in order to demonstrate compliance with local rules. In some implementations, the ride service server may determine whether the user is a designated distance from other passengers in the queue as required by local rules. For example, in general queuing lines (e.g., within a bus terminal, airport terminal, or other public areas) where the local rules provide for a designated spacing from the location of the user to another user, ranging between devices may be used to determine whether users are within the rules indicated by the local rules. For example, with ultra-wideband (UWB) or 5G sidelink positioning, may be used to determine relative distances between devices/users. If the server or mobile device 102 determines that the user or mobile device 102 is located within the allowable area (and distanced from other users as required by local rules), mobile device 102 and the user may proceed with the ride service. However, if the server or mobile device 102 determines that the user or mobile device 102 is not located within the allowable area or is violating distance rules, a notification may be presented to the user on mobile device 102 prompting the user to move to the allowable area or an appropriate distance. AR assistance may be provided to the user to facilitate finding the allowable areas or appropriate distances from other users. The user may be prevented from proceeding with the ride service until it is determined that the user or mobile device 102 is located within an allowable passenger loading area.

Figure 8:
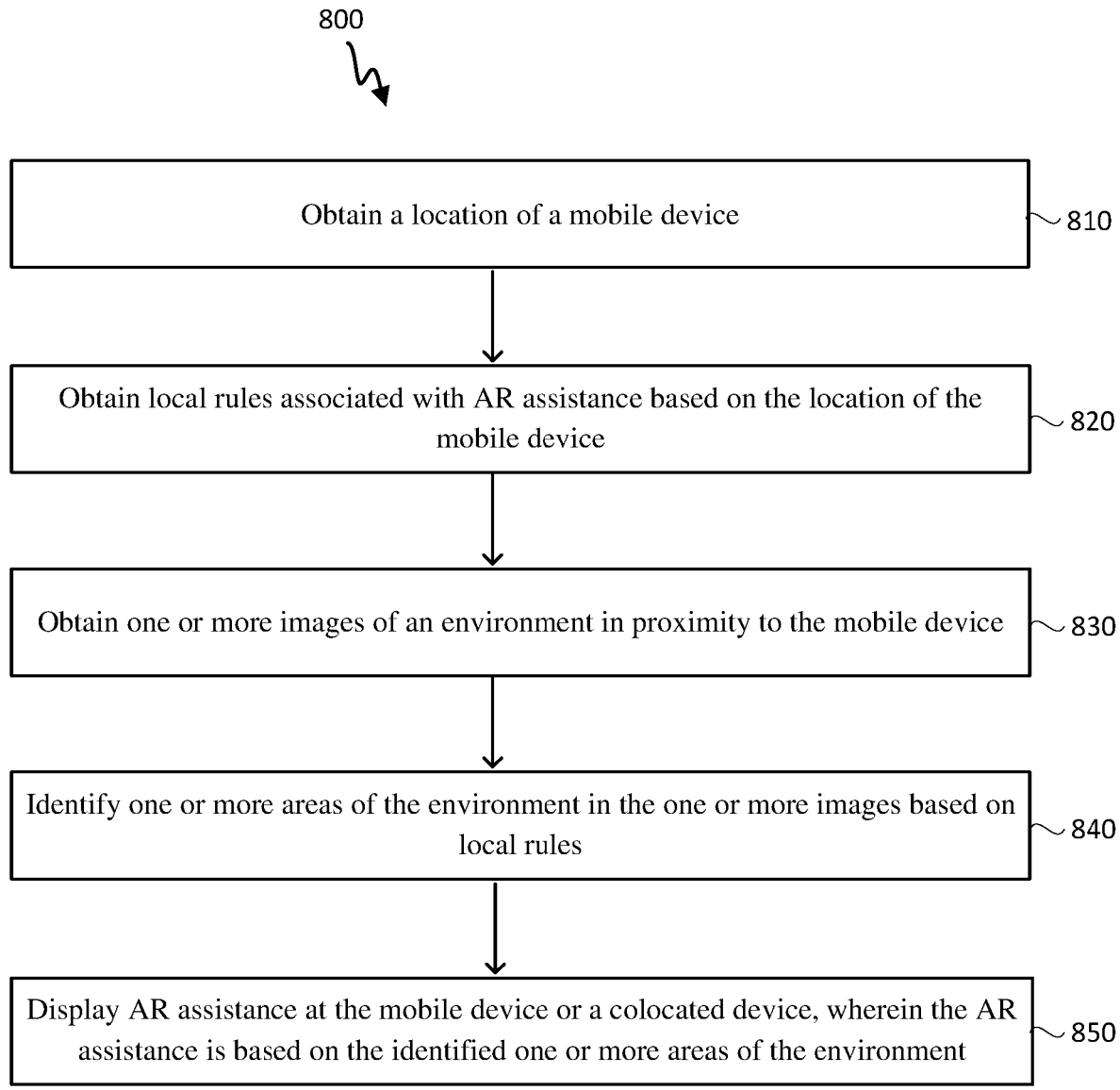
FIG. 8 is a flowchart illustrating an example method for providing augmented reality assistance.

FIG. 8 is a flowchart illustrating an example method 800 for requesting a rental of a transportation device (e.g., a rental vehicle) and request for a refund of a deposit for the transportation device. In one example, method 800 is implemented by processor 361 of mobile device 102. For example, each block of method 800 may be embodied as processor-executable instructions that when executed by processor 361, cause processor 361 to perform the functions of each block.

At block 810, a location of mobile device 102 may be obtained. In one example, mobile device 102 obtains its own location by using assisted GNSS methods or other mobile device-based positioning methods (sometimes referred to as UE-based positioning methods). In one example, the location of the mobile device may be a coarse location of the mobile device, and a precise location of the mobile device may be obtained based on the one or more images of an environment and positioning based on one or more of a satellite positioning system, a wireless wide area network, and a wireless local area network. In another example, mobile device 102 may obtain its location from location server 160, RSU 125, another mobile device, a base station 120, access point 130, or from another suitable location-determining device. In one embodiment, processor 361 of mobile device 102 may be a means for obtaining a location of the apparatus (i.e., mobile device 102). In other embodiments, wireless transceiver 340 of mobile device 102 may be the means for obtaining the location of the apparatus. In other embodiments, wireless transceiver 340 and/or SPS receiver 320 of mobile device 102 may be the means for obtaining the coarse location of the apparatus and the image sensor 314 along with, e.g., the wireless transceiver 340 and/or SPS receiver 320 of mobile device 102 may be the means for obtaining the precise location of the apparatus.

At block 820, mobile device 102 may obtain local rules associated with AR assistance based on the location of mobile device. In one example, the local rules associated with the location of mobile device may be prefetched whenever the location triggers a particular service, such as ride sharing, transportation, etc., or e.g., when the location indicate entry to a particular venue, such as a theme park. In one example, the local rules may be obtained based on a coarse location of the mobile device 102. In one example, mobile device 102 may generate or receive a request for augment reality (AR) assistance and may transmit a request AR assistance with the location of mobile device 102 to rental management server 145 and/or to parking location server 155, and receives AR assistance data from rental management server 145 and/or parking location server 155. For example, the mobile device 102 may request AR assistance to determine an acceptable parking area or an incentivized parking area in which to park the rental vehicle such as in, e.g., block 650, 660, and/or 670 of method 600. The user may operate user interface 350 of mobile device 102 and responsive to user input, mobile device 102 may generate the request for AR assistance. Alternatively, mobile device 102 may receive the request from another device, such as a wearable device operated by the user. Mobile device 102 may transmit the request to rental management server 145 and/or to parking location server 155 in some examples. In response, the mobile device 102 may receive AR assistance data from rental management server 145 and/or parking location server 155 that may include the local rules, as well as other AR assistance data, such as features in an high-definition map or a visual map (e.g., a 3D map of a venue) that would indicate where particular parking areas or pickup areas may be. In one embodiment, processor 361 of mobile device 102 may be a means for obtaining local rules based on the location of the apparatus (i.e., mobile device 102). In another embodiment, wireless transceiver 340 of mobile device 102 may be the means for obtaining local rules based on the location of the apparatus.

At block 830, mobile device 102 obtains one or more images of an environment in proximity to the mobile device. For example, mobile device 102 may use image sensor 314 to capture images of the environment within the FOV of image sensor 314. Alternatively, mobile device 102 may receive images of the environment proximate to mobile device 102 from one or more remote cameras 175 or other devices with image sensors. In one embodiment, image sensor 314 may be a means for obtaining one or more images of an environment in proximity to the apparatus (i.e., mobile device 102). In another embodiment, wireless transceiver 340 may be the means for obtaining one or more images of the environment in proximity to the apparatus.

At block 840, mobile device 102 may identify one or more areas of the environment in the one or more images based on the local rules. The identified areas may be parking areas for parking the rental vehicle as described above. For example, the areas may include allowed parking areas, prohibited parking areas, and/or incentivized parking areas. In another embodiment, the identified areas may be passenger loading areas indicating acceptable areas in which passengers may wait for a transport vehicle (such as a taxi) to pick them up. For example, the areas may include allowed passenger loading areas, prohibited passenger loading areas, and/or incentivized passenger loading areas. In one example, the areas may include locations that are a designated distance away from other mobile device, e.g., as specified by the local rules. In one embodiment, processor 361 of mobile device 102 may be a means for identifying one or more areas of the environment in the one or more images based on the local rules.

At block 850, AR assistance may be displayed at mobile device 102 or a co-located device, such as a smart watch or other wearable device. The AR assistance is based on the identified one or more areas of the environment. For example, the AR assistance data used for display may be based on the location of the mobile device 102, and in some implementations, based on a precise location of the mobile device 102. As noted above, the AR assistance may be displayed on display 312, for example, and may visually indicate the various parking or passenger loading areas within the environment proximate to mobile device 102. In one embodiment, processor 361 of mobile device 102 may be a means for displaying AR assistance at the apparatus, wherein the AR assistance is based on the identified one or more areas of the environment. In another embodiment, display 312 may be the means for displaying the AR assistance at the apparatus.

Reference throughout this specification to "one example", "an example", "certain examples", "in an embodiment", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or "in an embodiment" or other like phrases in various places throughout this specification are not necessarily all referring to the same feature, example, and/or limitation. Furthermore, the particular features, structures, or characteristics may be combined or modified in one or more examples and/or features and across various embodiments. The specified embodiments are not intended to be limiting relative to implementations, which may vary in detail; one skilled in the art will realize that other non-specified embodiments may also be used with or to modify the described embodiments.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, steps, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WAN"), a wireless local area network ("WLAN"), a wireless personal area network (PAN), and so on. The term "network" and "system" may be used interchangeably herein. A WAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, Long Term Evolution ("LTE"), Fifth Generation ("5G") or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a PAN may comprise a Bluetooth network, an IEEE 802.15x, comprising a Zigbee network, for example. Wireless communication implementations described herein may also be used in connection with any combination of WAN, WLAN or PAN.

In another aspect, as previously mentioned, a wireless transmitter or access point may comprise a wireless transceiver device, utilized to extend cellular telephone service into a business or home or vehicle. In such an implementation, one or more vehicles may communicate with a wireless transceiver device via a code division multiple access ("CDMA") cellular communication protocol, for example.

Techniques described herein may be used with a satellite positioning system ("SPS") that includes any one of several global navigation satellite systems ("GNSS" such as the Global Positioning system "GPS", the Russian GLONASS system and the European Union's Gallileo system and the Chinese BeiDou and BeiDou-2 systems) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, the claimed subject matter is not limited to the examples disclosed; such claimed subject matter may also include all aspects falling within the scope of the claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of providing augmented reality (AR) assistance, the method comprising:
   obtaining a location of a mobile device;
   transmitting, to a server, the location of the mobile device;
   receiving, a request to move based on the location of the mobile device, wherein the request includes an identification of an acceptable parking area that is in compliance with local rules;
   transmitting, to the server, an AR assistance request for the server to provide AR assistance for the acceptable parking area;
   obtaining, from the server, AR assistance data based on the AR assistance request and the location of the mobile device;
   obtaining one or more images of an environment in proximity to the mobile device;
   identifying one or more areas of the environment in the one or more images based on the acceptable parking area; and
   displaying the AR assistance at the mobile device, wherein the AR assistance is based on the identified one or more areas of the environment and the AR assistance data.

2. The method of claim 1, further comprising transmitting a second request to rent a vehicle using the mobile device and receiving an indication of an incentive to park the vehicle in a designated parking area.

3. The method of claim 1, wherein the one or more areas of the environment comprises an area in which parking of a vehicle is allowed.

4. The method of claim 1, wherein the one or more areas of the environment further comprises identifying an area in which parking of a vehicle is prohibited.

5. The method of claim 1, wherein the one or more areas of the environment comprises a first area for which an incentive is provided for parking a vehicle in the first area.

6. The method of claim 5, further comprising determining that the vehicle is parked in the first area.

7. The method of claim 6, further comprising receiving the incentive responsive to the determination that the vehicle is parked in the first area.

8. The method of claim 1, wherein the one or more areas of the environment comprises an allowable area for passenger pickup.

9. The method of claim 8, wherein the allowable area for passenger pickup comprises locations that are a designated distance away from other passengers.

10. The method of claim 8, wherein displaying the AR assistance comprises displaying an indication of the allowable area for passenger pickup.

11. The method of claim 9, further comprising determining that a user of the mobile device is located within the allowable area for passenger pickup.

12. The method of claim 1, wherein the location of the mobile device comprises a coarse location, wherein the local rules are obtained based on the coarse location.

13. The method of claim 12, wherein the method further comprising: determining a precise location of the mobile device based on the one or more images of the environment and positioning signals from one or more of a satellite positioning system, a wireless wide area network, a wireless local area network, or a combination thereof; wherein the AR assistance data used for displaying the AR assistance is determined based on the precise location.

14. A mobile device, comprising:
   a wireless transceiver;
   a memory; and
   at least one processor, communicatively coupled to the wireless transceiver and the memory, wherein the at least one processor is configured to:
   obtain a location of the mobile device;
   transmit, to a server, the location of the mobile device;
   receive, a request to move based on the location of the mobile device, wherein the request includes an identification of an acceptable parking area that is in compliance with local rules;
   transmit, to the server, an augmented reality (AR) assistance request for the server to provide AR assistance for the acceptable parking area;
   obtain, from the server, AR assistance data based on the AR assistance request and the location of the mobile device;
   obtain one or more images of an environment in proximity to the mobile device;
   identify one or more areas of the environment in the one or more images based on the acceptable parking area; and
   display the AR assistance at the mobile device, wherein the AR assistance is based on the identified one or more areas of the environment and the AR assistance data.

15. The mobile device of claim 14, wherein the at least one processor is further configured to transmit a second request to rent a vehicle using the wireless transceiver and receive an indication of an incentive to park the vehicle in a designated parking area.

16. The mobile device of claim 14, wherein the one or more areas of the environment comprises an area in which to park a vehicle.

17. The mobile device of claim 14, wherein the one or more areas of the environment comprises an area in which parking of a vehicle is prohibited.

18. The mobile device of claim 14, wherein the one or more areas of the environment comprises a first area for which an incentive is provided for parking a vehicle in the first area.

19. The mobile device of claim 18, wherein the at least one processor is further configured to determine that the vehicle is parked in the first area.

20. The mobile device of claim 19, wherein the at least one processor is further configured to receive the incentive responsive to the determination that the vehicle is parked in the first area.

21. The mobile device of claim 14, wherein the one or more areas of the environment comprises an allowable area for passenger pickup.

22. The mobile device of claim 21, wherein the allowable area for passenger pickup comprises locations that are a designated distance away from other passengers.

23. The mobile device of claim 21, wherein the at least one processor is configured to display the AR assistance by displaying an indication of the allowable area for passenger pickup.

24. The mobile device of claim 23, wherein the at least one processor is further configured to determine that a user of the mobile device is located within the allowable area for passenger pickup.

25. The mobile device of claim 14, wherein the location of the mobile device comprises a coarse location of the mobile device, wherein the local rules are obtained based on the coarse location.

26. The mobile device of claim 25, wherein the at least one processor is further configured to: determine a precise location of the mobile device based on the one or more images of the environment and positioning signals from one or more of a satellite positioning system, a wireless wide area network, a wireless local area network, or a combination thereof; wherein the AR assistance data used for displaying the AR assistance is determined based on the precise location.

27. An apparatus, comprising:
means for obtaining a location of the apparatus;
means for transmitting, to a server, the location of the apparatus;
means for receiving, a request to move based on the location of the apparatus, wherein the request includes an identification of an acceptable parking area that is in compliance with local rules;
means for transmitting, to the server, an augmented reality (AR) assistance request for the server to provide AR assistance for the acceptable parking area;
means for obtaining, from the server, AR assistance data based on the AR assistance request and the location of the apparatus;
means for obtaining one or more images of an environment in proximity to the apparatus;
means for identifying one or more areas of the environment in the one or more images based on the acceptable parking area; and
means for displaying the AR assistance at the apparatus, wherein the AR assistance is based on the identified one or more areas of the environment and the AR assistance data.

28. The apparatus of claim 27, further comprising means for transmitting a second request to rent a vehicle using the apparatus, and means for receiving an indication of an incentive to park the vehicle in a designated parking area.

29. The apparatus of claim 27, wherein the one or more areas of the environment comprises a first area for which an incentive is provided for parking a vehicle in the first area.

30. The apparatus of claim 29, further comprising means for determining that a vehicle is parked in the first area.

31. The apparatus of claim 30, further comprising means for receiving the incentive responsive to the determination that a vehicle is parked in the first area.

32. The apparatus of claim 27, wherein the location of the apparatus comprises a coarse location, wherein the local rules are obtained based on the coarse location.

33. The apparatus of claim 32, wherein the apparatus further comprises: means for determining a precise location of the apparatus based on the one or more images of the environment and positioning signals from one or more of a satellite positioning system, a wireless wide area network, a wireless local area network, or a combination thereof; wherein the AR assistance data used for displaying the AR assistance is determined based on the precise location.

34. A non-transitory storage medium comprising processor-executable instructions, wherein when a processor executes the instructions, the processor is programmed to:
obtain a location of a mobile device;
transmit, to a server, the location of the mobile device;
receive, a request to move based on the location of the mobile device, wherein the request includes an identification of an acceptable parking area that is in compliance with local rules;
transmit, to the server, an augmented reality (AR) assistance request for the server to provide AR assistance for the acceptable parking area;
obtain, from the server, AR assistance data based on the AR assistance request and the location of the mobile device;
obtain one or more images of an environment in proximity to the mobile device;
identify one or more areas of the environment in the one or more images based on the acceptable parking area; and
display the AR assistance at the mobile device, wherein the AR assistance is based on the identified one or more areas of the environment and the AR assistance data.

35. A method of supporting vehicle parking management using a mobile device, the method comprising:
transmitting a first request to rent a vehicle using the mobile device, wherein the vehicle is activated in response to the first request;
obtaining a location of the mobile device;
sending a first notification of parking the vehicle including a first indication of the location using the mobile device;
receiving a second request to move the vehicle based on the location being not in compliance with local rules, wherein the second request includes an identification of an acceptable parking area that is in compliance with the local rules and includes augmented reality (AR) assistance data for the acceptable parking area;
displaying AR assistance based on the identification of the acceptable parking area and the AR assistance data;
obtaining a new location of the mobile device after the vehicle is moved;
sending a second notification of parking the vehicle including a second indication of the new location using the mobile device; and
receiving an acknowledgement of parking the vehicle in the acceptable parking area.

36. The method of claim 35, wherein the second request to move the vehicle to the new parking area comprises an incentive to move the vehicle, the incentive comprising pecuniary, non-pecuniary, or a combination thereof.

37. A mobile device, comprising:
a wireless transceiver;
a memory; and
at least one processor, communicatively coupled to the wireless transceiver and the memory, wherein the at least one processor is configured to:
transmit a first request to rent a vehicle using the mobile device, wherein the vehicle is activated in response to the first request;
obtain a location of the mobile device;
send a first notification of parking the vehicle including a first indication of the location using the mobile device;
receive a second request to move the vehicle based on the location being not in compliance with local rules, wherein the second request includes an identification of an acceptable parking area that is in compliance with the local rules and includes augmented reality (AR) assistance data for the acceptable parking area;
display AR assistance based on the identification of the acceptable parking area and the AR assistance data;

obtain a new location of the mobile device after the vehicle is moved;

send a second notification of parking the vehicle including a second indication of the new location using the mobile device; and receive an acknowledgement of parking the vehicle in an acceptable parking area based on the new location being in compliance with the local rules.

38. The mobile device of claim 37, wherein the second request to move the vehicle to the new parking area comprises an incentive to move the vehicle, the incentive comprising pecuniary, non-pecuniary, or a combination thereof.

39. A method of supporting vehicle parking management using a mobile device, the method performed by a server, the method comprising:

receiving a first request to rent a vehicle from the mobile device, wherein the vehicle is activated in response to the first request;

receiving a first notification of parking the vehicle from the mobile device, the first notification including a first indication of a location of the mobile device;

sending a second request to move the vehicle to the mobile device based on the first indication of the location of the mobile device and based on the location being not in compliance with local rules, wherein the second request includes an identification of an acceptable parking area that is in compliance with the local rules and AR assistance data for the acceptable parking area;

receiving a second notification of parking the vehicle from the mobile device, the second notification including a second indication of a new location of the mobile device; and sending an acknowledgement of parking the vehicle in the acceptable parking area to the mobile device based on the second indication of the new location of the mobile device and based on the new location being in the acceptable parking area.

40. The method of claim 39, wherein the request to move the vehicle to the new parking area comprises an incentive to move the vehicle, the incentive comprising pecuniary, non-pecuniary, or a combination thereof.

41. A server, comprising:

a network interface;

a memory; and at least one processor communicatively coupled to the network interface and the memory, wherein the at least one processor is configured to:

receive a first request to rent a vehicle from a mobile device, wherein the vehicle is activated in response to the first request;

receive a first notification of parking the vehicle from the mobile device, the first notification including a first indication of a location of the mobile device;

send a second request to move the vehicle to the mobile device based on the first indication of the location of the mobile device and based on the location being not in compliance with local rules, wherein the second request includes an identification of an acceptable parking area that is in compliance with the local rules and AR assistance data for the acceptable parking area;

receive a second notification of parking the vehicle from the mobile device, the second notification including a second indication of a new location of the mobile device; and send an acknowledgement of parking the vehicle in the acceptable parking area to the mobile device based on the second indication of the new location of the mobile device and based on the new location being in the acceptable parking area.

42. The server of claim 41, wherein the second request to move the vehicle to the new parking area comprises an incentive to move the vehicle, the incentive comprising pecuniary, non-pecuniary, or a combination thereof.

* * * * *